(12) United States Patent
Kaneko

(10) Patent No.: US 9,872,042 B2
(45) Date of Patent: Jan. 16, 2018

(54) IMAGE ENCODING APPARATUS AND IMAGE ENCODING METHOD

(71) Applicant: CANON KABUSHIKI KAISHA, Tokyo (JP)

(72) Inventor: Yushi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/259,318

(22) Filed: Sep. 8, 2016

(65) Prior Publication Data
US 2017/0070753 A1    Mar. 9, 2017

(30) Foreign Application Priority Data

Sep. 9, 2015 (JP) ................. 2015-177919

(51) Int. Cl.
| | |
|---|---|
| H04N 19/61 | (2014.01) |
| H04N 19/50 | (2014.01) |
| H04N 19/625 | (2014.01) |
| H04N 19/124 | (2014.01) |
| H04N 19/14 | (2014.01) |
| H04N 19/103 | (2014.01) |
| H04N 19/176 | (2014.01) |
| H04N 19/593 | (2014.01) |
| H04N 19/146 | (2014.01) |
| H04N 19/182 | (2014.01) |

(52) U.S. Cl.
CPC ........... *H04N 19/61* (2014.11); *H04N 19/103* (2014.11); *H04N 19/124* (2014.11); *H04N 19/14* (2014.11); *H04N 19/146* (2014.11); *H04N 19/176* (2014.11); *H04N 19/50* (2014.11); *H04N 19/593* (2014.11); *H04N 19/625* (2014.11); *H04N 19/182* (2014.11)

(58) Field of Classification Search
None
See application file for complete search history.

(56) References Cited

U.S. PATENT DOCUMENTS

| | | | |
|---|---|---|---|
| 2016/0219289 A1* | 7/2016 | Saunders | H04N 19/33 |
| 2016/0323578 A1* | 11/2016 | Kaneko | H04N 19/124 |
| 2016/0323582 A1* | 11/2016 | Takeda | H04N 19/176 |
| 2016/0360196 A1* | 12/2016 | Endo | H04N 19/103 |

FOREIGN PATENT DOCUMENTS

JP    2010-004514 A    1/2010

* cited by examiner

*Primary Examiner* — Bernard Krasnic
(74) *Attorney, Agent, or Firm* — Cowan, Liebowitz & Latman, P.C.

(57) ABSTRACT

An image processing apparatus comprising an acquisition unit inputs image data, and outputs image data of blocks comprising a plurality of groups each including a predetermined number of pixels, wherein the acquisition unit changes an order of the image data so that arrangements of pixels between adjacent blocks are opposite, a deciding unit decides, for each of the groups, a quantization parameter, that is used for quantization of image data of the group, and an encoding scheme such that a code length of the blocks, which are encoding targets, does not exceed a predetermined value and an encoding unit, in accordance with the quantization parameters and encoding schemes decided for each group by the deciding unit, encodes the image data of the encoding target blocks output from the acquisition unit to generate encoded data.

13 Claims, 12 Drawing Sheets

FIG. 4A

| GROUP NUMBER | 0 | | | 1 | | | 2 | | | ...... | 15 | | |
|---|---|---|---|---|---|---|---|---|---|---|---|---|---|
| PIXEL NUMBER | 0 | 1 | 2 | 3 | 4 | 5 | 6 | 7 | 8 | ...... | 45 | 46 | 47 |
| IMAGE DATA | R0 | G0 | B0 | R1 | G1 | B1 | R2 | G2 | B2 | ...... | R15 | G15 | B15 |

FIG. 4B

| GROUP NUMBER | 0 | | | 1 | | | 2 | | | ...... | 15 | | |
|---|---|---|---|---|---|---|---|---|---|---|---|---|---|
| PIXEL NUMBER | 47 | 46 | 45 | 44 | 43 | 42 | 41 | 40 | 39 | ...... | 2 | 1 | 0 |
| IMAGE DATA | B15 | G15 | R15 | B14 | G14 | R14 | B13 | G13 | R13 | ...... | B0 | G0 | R0 |

FIG. 4C

| GROUP NUMBER | 0 | | | | 1 | | | | 2 | | | | ...... | 7 | | | |
|---|---|---|---|---|---|---|---|---|---|---|---|---|---|---|---|---|---|
| PIXEL NUMBER | 0 | 1 | 2 | 3 | 4 | 5 | 6 | 7 | 8 | 9 | 10 | 11 | ...... | 28 | 29 | 30 | 31 |
| IMAGE DATA | Cb0 | Y0 | Cr0 | Y1 | Cb1 | Y2 | Cr1 | Y3 | Cb2 | Y4 | Cr2 | Y5 | ...... | Cb7 | Y14 | Cr7 | Y15 |

FIG. 4D

| GROUP NUMBER | 0 | | | | 1 | | | | 2 | | | | ...... | 7 | | | |
|---|---|---|---|---|---|---|---|---|---|---|---|---|---|---|---|---|---|
| PIXEL NUMBER | 0 | 1 | 2 | 3 | 4 | 5 | 6 | 7 | 8 | 9 | 10 | 11 | ...... | 28 | 29 | 30 | 31 |
| IMAGE DATA | Gr0 | R0 | Gb0 | B0 | Gr1 | R1 | Gb1 | B1 | Gr2 | R2 | Gb2 | B2 | ...... | R7 | Gr7 | Gb7 | B7 |

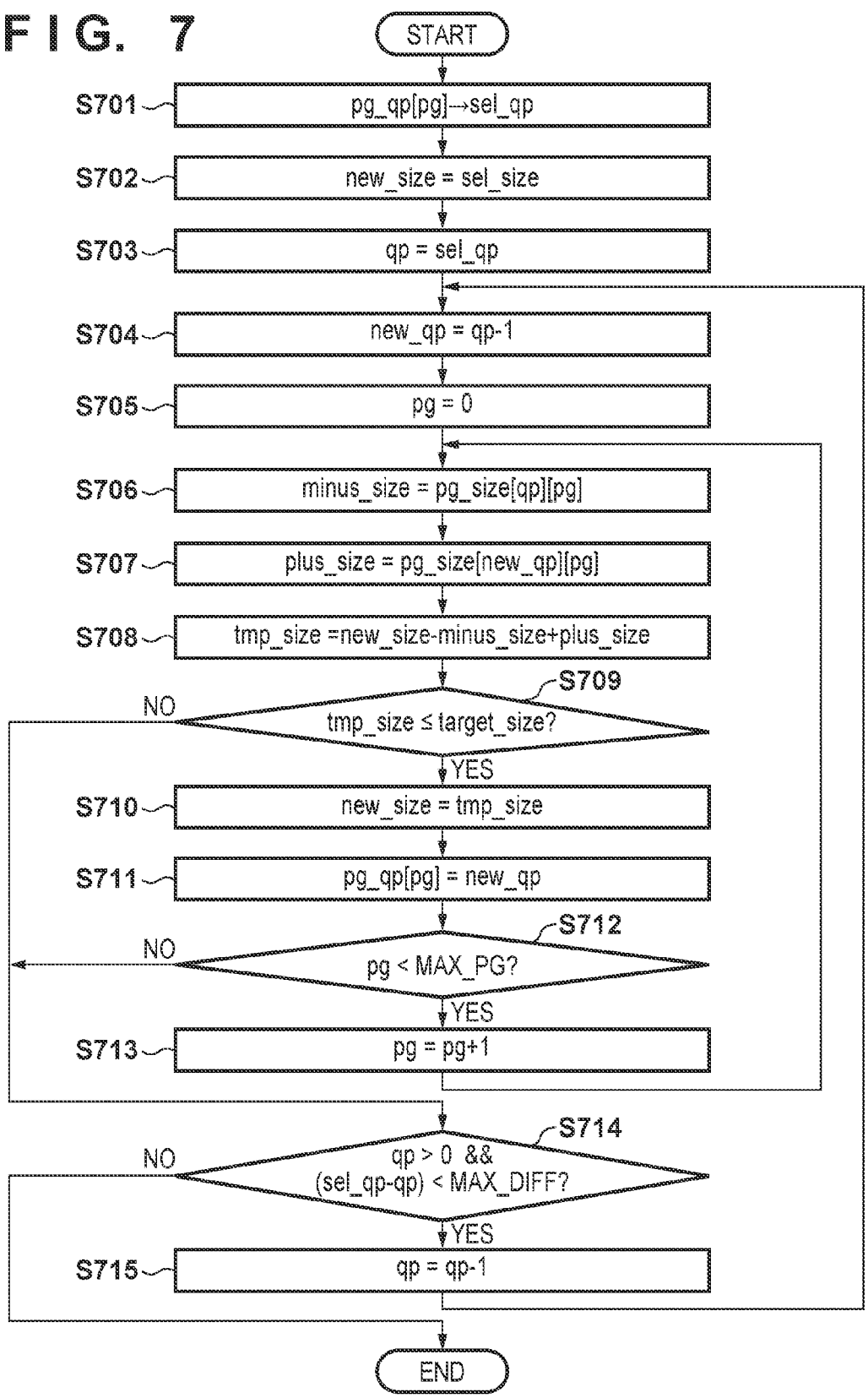

FIG. 8A

| QP | PIXEL GROUP NUMBER | | | | | | | | | | | | | | | | HEADER CODE LENGTH | BLOCK CODE LENGTH |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | |
| 0 | 30 | 30 | 30 | 22 | 24 | 18 | 17 | 15 | 16 | 22 | 20 | 22 | 12 | 20 | 18 | 18 | 48 | 382 |
| 1 | 27 | 27 | 27 | 22 | 23 | 18 | 15 | 15 | 16 | 22 | 17 | 18 | 12 | 20 | 18 | 18 | 48 | 363 |
| 2 | 24 | 24 | 24 | 18 | 19 | 15 | 13 | 13 | 16 | 18 | 17 | 15 | 12 | 16 | 14 | 16 | 48 | 326 |
| 3 | 21 | 21 | 21 | 14 | 15 | 15 | 12 | 12 | 15 | 15 | 15 | 13 | 12 | 14 | 14 | 16 | 48 | 293 |

FIG. 8B

| QP | PIXEL GROUP NUMBER | | | | | | | | | | | | | | | | HEADER CODE LENGTH | BLOCK CODE LENGTH |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | | |
| 0 | 30 | 30 | 30 | 22 | 24 | 18 | 17 | 15 | 16 | 22 | 20 | 22 | 12 | 20 | 18 | 18 | 48 | 382 |
| 1 | 27 | 27 | 27 | 22 | 23 | 18 | 15 | 15 | 16 | 22 | 17 | 18 | 12 | 20 | 18 | 18 | 48 | 363 |
| 2 | 24 | 24 | 24 | 18 | 19 | 15 | 13 | 13 | 16 | 18 | 17 | 15 | 12 | 16 | 18 | 16 | 48 | 326 |
| 3 | 21 | 21 | 21 | 14 | 15 | 15 | 12 | 12 | 15 | 15 | 15 | 13 | 12 | 14 | 14 | 16 | 48 | 293 |

FIG. 8C

| QP | 15 | 14 | 13 | 12 | 11 | 10 | 9 | 8 | 7 | 6 | 5 | 4 | 3 | 2 | 1 | 0 | HEADER CODE LENGTH | BLOCK CODE LENGTH |
|---|---|---|---|---|---|---|---|---|---|---|---|---|---|---|---|---|---|---|
| 0 | 18 | 18 | 13 | 12 | 14 | 13 | 12 | 22 | 20 | 22 | 16 | 15 | 17 | 18 | 24 | 22 | 48 | 382 |
| 1 | 18 | 18 | 20 | 20 | 18 | 20 | 12 | 16 | 18 | 17 | 15 | 18 | 22 | 22 | 27 | 27 | 48 | 363 |
| 2 | 16 | 16 | 16 | 16 | 16 | 16 | 12 | 16 | 15 | 13 | 12 | 19 | 23 | 24 | 24 | 24 | 48 | 326 |
| 3 | 16 | 14 | 14 | 14 | 14 | 14 | 12 | 15 | 13 | 12 | 12 | 15 | 15 | 21 | 21 | 21 | 48 | 293 |

FIG. 8D

| QP | 15 | 14 | 13 | 12 | 11 | 10 | 9 | 8 | 7 | 6 | 5 | 4 | 3 | 2 | 1 | 0 | HEADER CODE LENGTH | BLOCK CODE LENGTH |
|---|---|---|---|---|---|---|---|---|---|---|---|---|---|---|---|---|---|---|
| 0 | 18 | 18 | 13 | 12 | 14 | 13 | 12 | 22 | 20 | 22 | 16 | 15 | 17 | 18 | 24 | 22 | 48 | 382 |
| 1 | 18 | 18 | 20 | 20 | 18 | 20 | 12 | 16 | 18 | 17 | 15 | 18 | 22 | 22 | 27 | 27 | 48 | 363 |
| 2 | 16 | 16 | 16 | 16 | 16 | 16 | 12 | 16 | 15 | 13 | 12 | 19 | 23 | 24 | 24 | 24 | 48 | 326 |
| 3 | 16 | 14 | 14 | 14 | 14 | 14 | 12 | 15 | 13 | 12 | 12 | 15 | 15 | 21 | 21 | 21 | 48 | 293 |

FIG. 8E

| QP | 15 | 14 | 13 | 12 | 11 | 10 | 9 | 8 | 7 | 6 | 5 | 4 | 3 | 2 | 1 | 0 | HEADER CODE LENGTH | BLOCK CODE LENGTH |
|---|---|---|---|---|---|---|---|---|---|---|---|---|---|---|---|---|---|---|
| 0 | 15 | 14 | 13 | 12 | 11 | 10 | 9 | 8 | 7 | 6 | 5 | 4 | 3 | 2 | 1 | 0 | 48 | 382 |
| 1 | 18 | 18 | 20 | 20 | 20 | 22 | 17 | 15 | 16 | 22 | 20 | 24 | 22 | 27 | 27 | 18 | 48 | 363 |
| 2 | 18 | 18 | 20 | 18 | 18 | 20 | 15 | 17 | 16 | 18 | 18 | 18 | 20 | 22 | 18 | 18 | 48 | 326 |
| 3 | 16 | 14 | 14 | 14 | 14 | 14 | 12 | 15 | 13 | 12 | 12 | 15 | 15 | 21 | 21 | 16 | 48 | 293 |

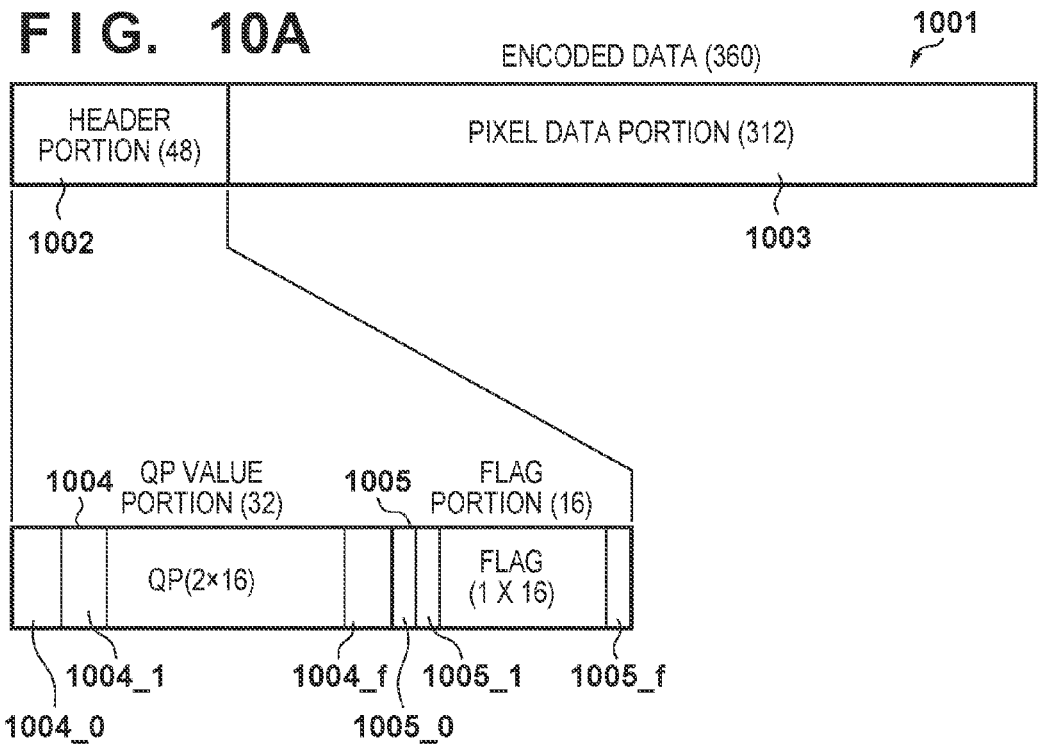
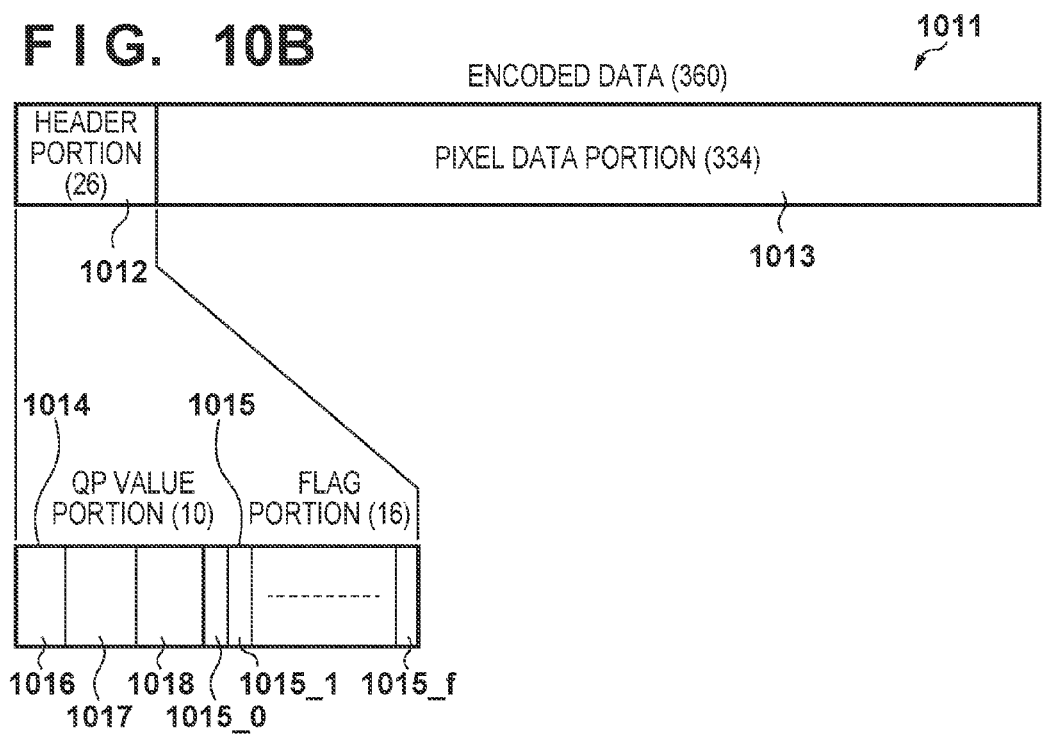

IMAGE ENCODING APPARATUS AND IMAGE ENCODING METHOD

BACKGROUND OF THE INVENTION

Field of the Invention

The invention relates to an image processing apparatus and an image processing method.

Description of the Related Art

In recent years, for image capturing apparatuses such as those for digital video or the like, the image data amount handled in a system has increased significantly in accompaniment of an increase in resolution and an increase in frame rates, and there is demand for acceleration of image memory and bus interface circuits. With respect to this, it is possible to handle demand for circuit acceleration by reducing the image data amount by performing compression encoding of image data for image memory and for a bus interface.

In such a case, it is desirable that the encoding scheme for image compression have a small circuit scale, and a short encoding delay. Therefore, conventional DCT-based encoding schemes as typified by JPEG and MPEG2 are unsuitable. Accordingly, a proposal has been made for a DPCM (Differential Pulse Code Modulation) based predictive encoding scheme (refer to Japanese Patent Laid-Open No. 2010-004514).

In a DPCM-based predictive encoding scheme, a degradation of image quality tends to occur at an edge portion where a change in pixel levels is large. In the proposed scheme of Japanese Patent Laid-Open No. 2010-004514, encoding with low image quality degradation is possible if a difference in values between adjacent pixel data is less than or equal to a predetermined threshold. However, if the difference in values between adjacent pixel data exceeds a predetermined threshold as with a sharp edge portion, it is necessary to halve the original pixel data bits by quantization (for example, to turn 10 bits into 5 bits), and this becomes a major cause of image quality degradation. Similarly, it becomes a major cause of image quality degradation if the differential between a predicted image and an encoding target image is large.

SUMMARY OF THE INVENTION

By realization of efficient encoding, a degradation of image quality is decreased at a portion where the differential between pixels is large such as a sharp edge portion, and furthermore an image quality degradation is reduced at a boundary portion of adjacent encoding target blocks.

One aspect of embodiments relates to an image processing apparatus comprising, an acquisition unit configured to input image data, and to output image data of blocks comprising a plurality of groups each including a predetermined number of pixels, wherein the acquisition unit changes an order of the image data so that arrangements of pixels between adjacent blocks are opposite, a deciding unit configured to decide, for each of the groups, a quantization parameter, that is used for quantization of image data of the group, and an encoding scheme such that a code length of the blocks, which are encoding targets, does not exceed a predetermined value, and an encoding unit configured to, in accordance with the quantization parameters and encoding schemes decided for each group by the deciding unit, encode the image data of the encoding target blocks output from the acquisition unit to generate encoded data, wherein the encoding unit encodes the image data using a first encoding scheme for outputting quantized image data and a second encoding scheme for outputting encoded data of a differential between quantized image data and predicted data, and wherein the deciding unit decides as the encoding scheme of the group whichever of the first encoding scheme and the second encoding scheme can achieve a smaller code length, and wherein the deciding unit, among a plurality of quantization parameters, decides as the quantization parameter of the group either a first quantization parameter, or a second quantization parameter corresponding to a smaller quantization step than the quantization step corresponding to the first quantization parameter, and wherein the deciding unit, so that the code length of the encoded data of the encoding target blocks, which are generated by quantizing all of the groups of the encoding target blocks using the first quantization parameter and encoding the respective groups using the decided encoding schemes, does not exceed the predetermined value and is a maximum value, decides one of the plurality of quantization parameters as the first quantization parameter, and decides the second quantization parameter as the quantization parameter for some of the groups of the encoding target blocks.

Further features of the present invention will become apparent from the following description of exemplary embodiments (with reference to the attached drawings).

BRIEF DESCRIPTION OF THE DRAWINGS

FIG. 4A-FIG. 4D are views for explaining a relationship between a pixel group and pixel data that configures an encoding block.

FIG. 7 is a flowchart that illustrates an example of processing of step S504 of FIG. 5.

FIG. 8A to FIG. 8E are views that illustrate an example of selected QPs and code lengths of pixel group units corresponding to an embodiment of the invention.

FIG. 10A and FIG. 10B are figures that illustrate examples of a format of encoded data corresponding to an embodiment of the invention.

DESCRIPTION OF THE EMBODIMENTS

Hereinafter, detailed explanation is given for embodiments of the invention with reference to the attached drawings.

First Embodiment (Explanation of Image Processing Apparatus)

Figure 1A:
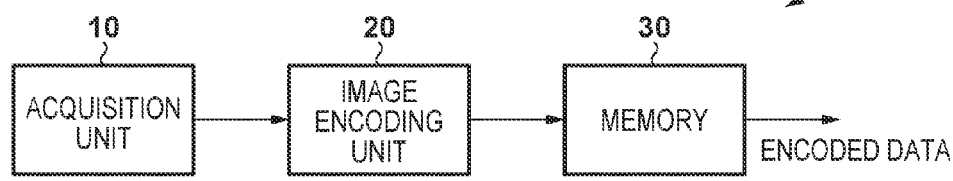
FIG. 1A is a block diagram for illustrating an example configuration of an image processing apparatus corresponding to an embodiment of the invention.

Hereinafter, explanation is given of an image processing apparatus corresponding to an embodiment of the invention. FIG. 1A is a view for illustrating an example configuration of an image processing apparatus in embodiments of the invention. An image processing apparatus 100 has an acquisition unit 10, an image encoding unit 20 and a memory 30, for example. In the image processing apparatus 100 of FIG. 1A, each block, except for physical devices such as image capturing elements and display elements, may be configured in hardware using a dedicated device, a logic circuit, a memory or the like. Alternatively, they may be configured in software by a computer such as a CPU executing a processing program stored in a memory. The image processing apparatus 100 can be implemented as a digital camera, for example, and in addition to that can be made to be an image capturing apparatus or an information processing terminal such as a personal computer, a mobile telephone, a smart phone, a PDA, a tablet terminal, a digital video camera, or the like, for example.

In FIG. 1A, the acquisition unit 10 has a function of inputting image data. The acquisition unit 10 includes a configuration for inputting image data via a transmission path from outside such as an image capturing unit equipped with an image sensor, for example. Alternatively, the acquisition unit 10 includes a configuration that reads image data from a recording medium. Also, the acquired image data may be still image data, and may also be moving image data. If the image data that the acquisition unit 10 acquires is moving image data, moving image data of a plurality of frames may be acquired consecutively.

The acquisition unit 10 supplies the acquired image data to the image encoding unit 20. The image encoding unit 20 outputs encoded data for which an amount of information is compressed by encoding the image data supplied from the acquisition unit 10 in accordance with an encoding scheme such as one of a pulse code modulation (PCM) or a differential pulse code modulation (DPCM). The outputted encoded data is stored in the memory 30. The memory 30 has a storage capacity necessary to store encoded data output from the image encoding unit 20. For the encoded data stored in the memory 30, image development processing and additional compression processing is implemented in a processing unit of a subsequent stage.

Additionally, in FIG. 1A, the acquisition unit, the image encoding unit 20 and the memory 30 are illustrated as independent configurations, but when implementing the image processing apparatus 100, these may be integrated together in one chip, for example, or may be configured independently as separate bodies.

(Explanation of Image Encoding Unit)

Figure 1B:
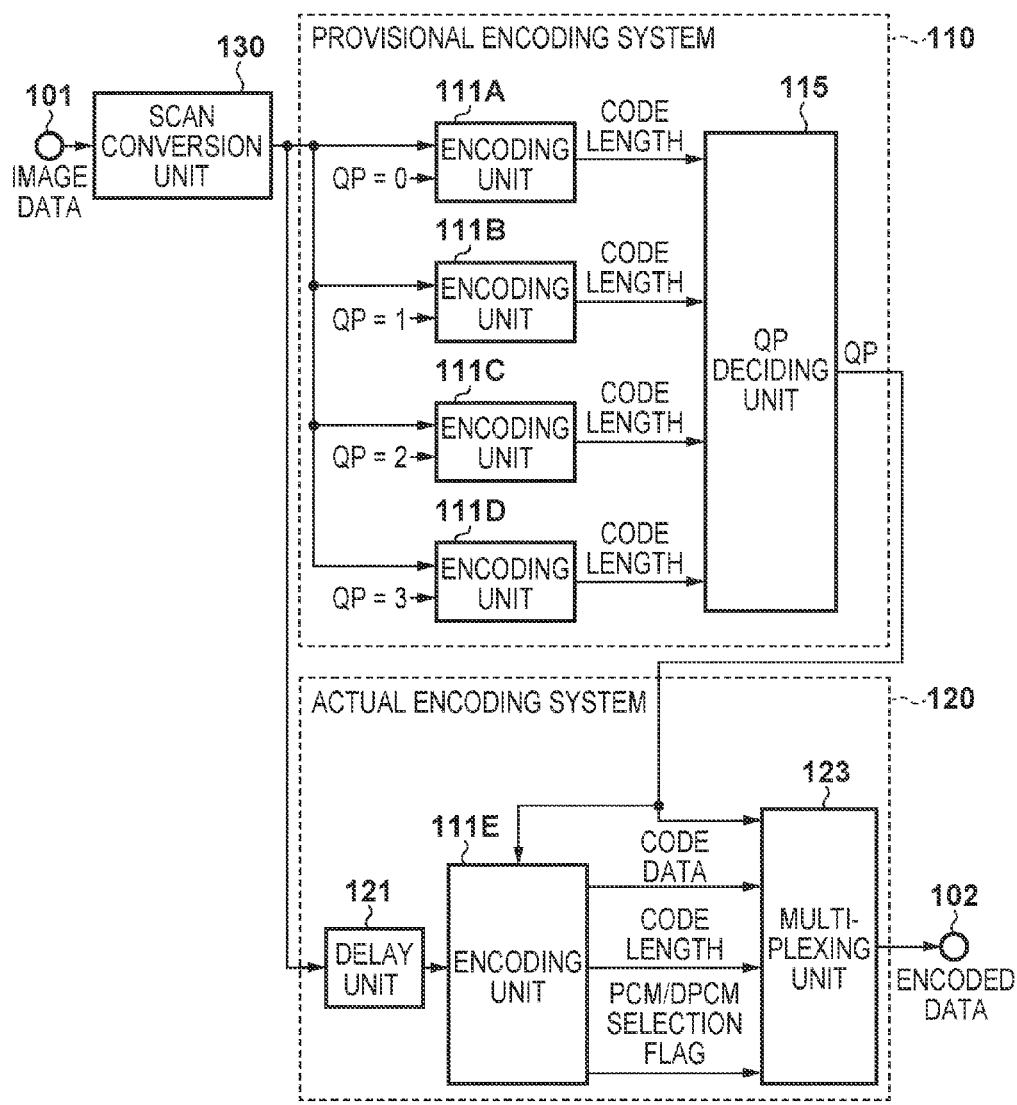
FIG. 1B is a block diagram for illustrating an example configuration of an image encoding unit corresponding to an embodiment of the invention.

Hereinafter, explanation is given of a configuration of the image encoding unit 20 corresponding to an embodiment of the invention with reference to FIG. 1B. FIG. 1B is a block diagram for illustrating an example configuration of the image encoding unit 20 corresponding to an embodiment of the invention. Hereinafter, explanation is given for operation of each block of the image encoding unit 20 of the present embodiment.

The image encoding unit 20 illustrated in FIG. 1A is configured by two large blocks of a provisional encoding system 110 and an actual encoding system 120. Furthermore, the provisional encoding system 110 is configured from encoding units 111A-111D and the QP deciding unit 115, and operates to decide a set of quantization parameters used when performing actual encoding by the actual encoding system 120. The actual encoding system 120 is comprised by a delay unit 121, an encoding unit 111E and a multiplexing unit 123, and operates so to execute actual encoding which includes quantization processing using the set of quantization parameters decided by the provisional encoding system 110. The image encoding unit 20 may be configured integrally in hardware using memory, logic circuits and dedicated devices as an image encoding apparatus, or may be configured by distributing among a plurality of devices. Alternatively, they may be configured in software by a computer such as a CPU executing a processing program stored in a memory.

(Explanation of Encoding Blocks and Pixel Groups)

Image data which is an encoding target is inputted into the image encoding unit 20 from outside via an input terminal 101, passing through a scan conversion unit 130. In the present embodiment, it is assumed that in the image encoding processing that the image encoding unit 20 executes, the input image data is divided into blocks (hereinafter referred to as "encoding blocks") that have a predetermined size (number of pixels), and that encoding is performed in units of encoding blocks. Also, the encoding blocks are further divided into "pixel groups" comprising a predetermined number of one or more pixels. A pixel group is a unit for which later described encoding method (PCM/DPCM) switching, and quantization parameter (hereinafter referred to as "QP") switching are performed. It is advantageous that pixel groups be configured by pixels having a high correlation such as pixels of the same coordinates or adjacent pixels, and they may be configured for a single color component, or may be configured for multiple color components.

Image data from the acquisition unit 10 is supplied to the input terminal 101 in a raster scan order. Image data from the input terminal 101 is inputted into the scan conversion unit 130 in a raster scan order. The scan conversion unit 130 temporarily holds image data for each encoding block, and odd-numbered blocks are output in a positive order without changing the scan order of the pixels, while for even-numbered blocks, the scan order of each line is inverted, and they are outputted in reverse order. For example, the first encoding block is output in positive order, and the second encoding block is output in reverse order. Here, outputting in reverse order means converting and outputting so as to output a head pixel of an inputted block as a final pixel, and to output the final pixel of the block as the head pixel. With this, the arrangement of the pixels respectively included in a plurality of blocks included in the same line is rearranged so adjacent blocks differ from each other with the positive order and the reverse order. The scan conversion unit 130 may output even-numbered blocks in the positive order, and output odd-numbered blocks in the reverse order.

In the present embodiment, RGB image data illustrated in FIG. 4A and FIG. 4B is explained as the image data format as an example, but it may be another data format. Details of other data formats are explained with reference to FIG. 4C and FIG. 4D at the end of the present embodiment. Also, it is assumed that image data is inputted in a raster scan order, and each pixel data item of R (red), G (green) and B (blue), which respectively are color components are time-divisionally multiplexed and input sequentially. Also, the bit depth of each pixel is 10 bits, as an example. As illustrated in FIG. 4B, the arrangement of each item of pixel data included in image data is in the reverse order for the scan converted image data. With this, the blocks of the image data alternates between blocks whose scan order is converted and blocks whose scan order is not converted, and such image data is inputted into the provisional encoding system 110 and the actual encoding system 120 and encoded.

In the present embodiment, 16 horizontal pixels×1 vertical pixel for each color component of RGB image data×3 colors=48 pixels is made to be an encoding block. Also, a total of 3 pixels—1 pixel for each color component—is made to be a pixel group.

FIG. 4A is a view for explaining a relationship between a pixel group and pixel data that configures an encoding block in the present embodiment. As illustrated in FIG. 4A, the encoding blocks are respectively configured from 16 pixels for each color component of R, G, and B, and to each of the sets of color components consisting of R, G, and B, a group number is assigned in accordance with a pixel position, and to each pixel, one of the pixel number 0 to 47 is assigned. For example, R0, G0 and B0, which respectively are the first pixel data items of the respective color components, configure a pixel group whose group number is "0", and R1, G1 and B1, which are the second pixel data items, configure a pixel group whose group number is "1". In the present embodiment, the data of each pixel is referred to as "image data". FIG. 4B illustrates a relationship between a pixel group and pixel data that configures encoding blocks output in reverse order from the scan conversion unit 130. Here, as can be seen from the original order, the group number, the pixel number, and the image data are illustrated, but the processing in the image encoding unit 20 is processed as something that is the same as the input of FIG. 4A.

(Explanation of an Encoding Unit 111)

Figure 3:
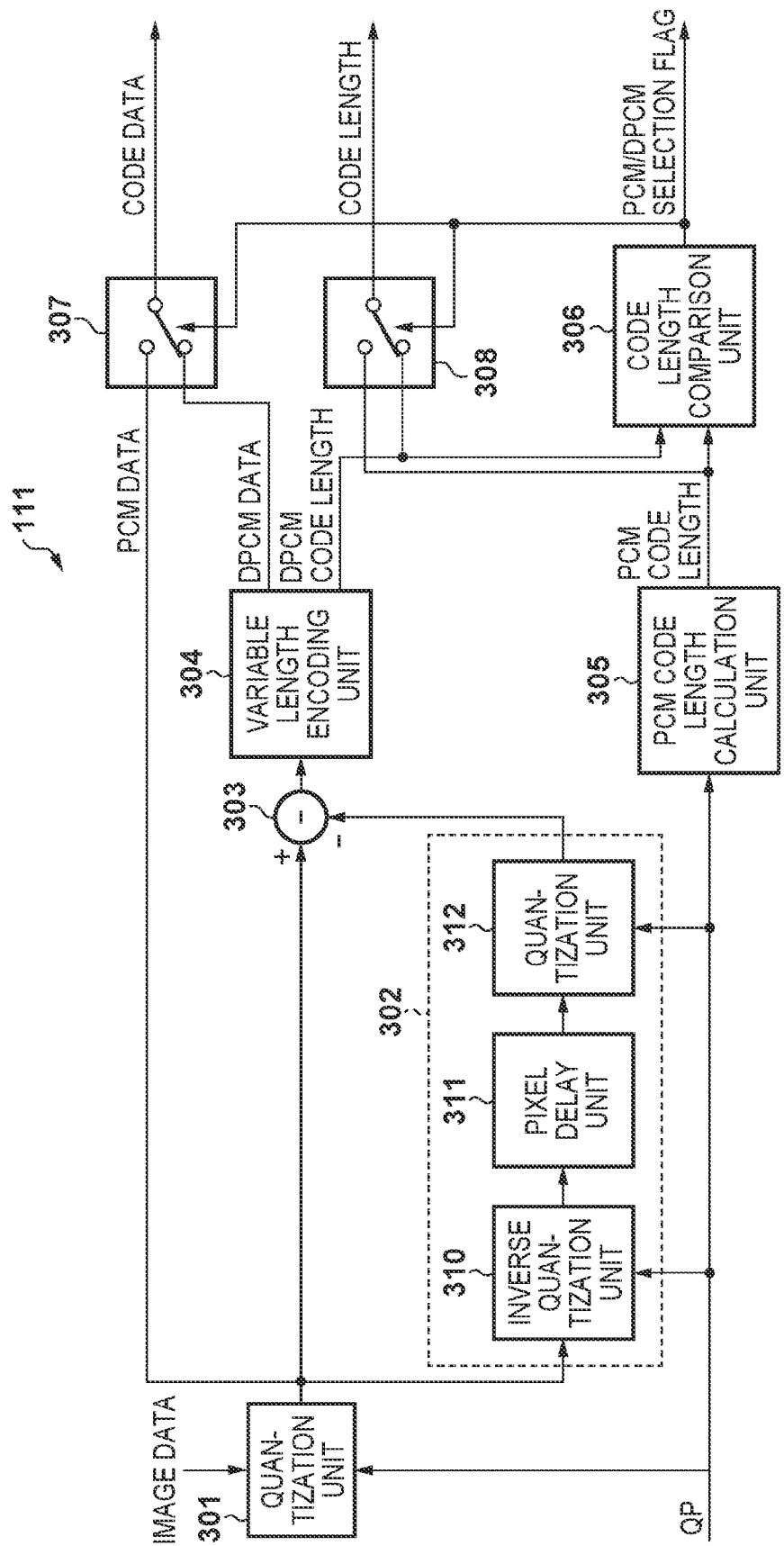
FIG. 3 is a block diagram for illustrating an example configuration of an image encoding unit corresponding to an embodiment of the invention.

Next, explanation is given with reference to FIG. 3 for a configuration and operation of the encoding unit 111 which is used commonly by the provisional encoding system 110 and the actual encoding system 120. FIG. 3 is a block diagram that illustrates an example configuration of the encoding unit 111. As illustrated in FIG. 3, the encoding unit 111 is configured to include, for example, a quantization unit 301, a prediction unit 302, a subtractor 303, a variable length encoding unit 304, a PCM code length calculation unit 305, a code length comparison unit 306 and selectors 307 and 308.

Image data and a QP are input into the encoding unit 111. In the case of the provisional encoding system 110, a QP may be assigned in advance as a fixed value for each of the encoding units 111A-111D. In FIG. 1B a case in which 0, 1, 2 and 3 are assigned as QPs for the encoding units 111A-111D in that order is illustrated as an example. In the case of the provisional encoding system 110, each encoding unit may hold a QP value in advance. A QP decided by the provisional encoding system 110 is input into the actual encoding system 120 from the QP deciding unit 115. Hereinafter, detailed explanation is given for specific configuration and operation of the encoding unit 111.

First, image data input into the encoding unit 111 is input into the quantization unit 301. The quantization unit 301 quantizes input image data in accordance with the provided QP, and outputs quantized data to the prediction unit 302, the subtractor 303 and a selector 307 respectively. In the present invention, quantization data that is quantized by the quantization unit 301 is referred to as PCM data. In the present embodiment, explanation is given assuming that the value of the QP is made to be an integer value for which a minimum value is made to be 0, and which can be changed in the range of 0-3; however, larger QP values may be set to use even larger quantization steps.

In the present embodiment, the quantization unit 301 makes a quantization step smaller (finer) the smaller the QP is, and makes a quantization step larger (coarser) the larger the QP is. When the QP increases by 1, a quantization is performed so that significant bits of the PCM data decrease 1 bit. For example, a quantization represented by Equation 1 is performed.

$$\text{Quant}=\text{Data}/(1<<\text{QP}) \qquad \text{(Equation 1)}$$

(Quant: quantization data, Data: input image data, QP: quantization parameter.)

Also, the 1<<QP indicates that the input image data is bit shifted by the number of bits indicated by the QP.

The significant bits and the values output for the QPs by the quantization as in Equation 1 are as follows.

QP=0: quantization step=1, the input data is output unchanged without being quantized. Significant bits are invariant.

QP=1: quantization step=2, the input data is quantized into ½. Significant bits are decreased by 1 bit.

QP=2: quantization step=4, the input data is quantized into ¼. Significant bits are decreased by 2 bits.

QP=n: quantization step=(1<<n), the input data is quantized into 1/(1<<n). Significant bits are decreased by n bits.

The foregoing Equation 1 indicates one example of quantization processing in the present embodiment, and the quantization processing is not limited to this. It is sufficient that it be a quantization such that the code length is decreased 1 bit whenever QP changes by 1. For example, a non-linear quantization may be performed. In the present embodiment, causing the value of QP to increase by 1 incrementally, from QP=0 to QP=n, is referred to as raising the quantization step by one step, making the quantization step larger by one step, making the quantization step coarser by one step, and the like, and conversely causing the value of QP to decrease by 1 incrementally, from QP=n to QP=0, is referred to as lowering the quantization step by one step, making the quantization step one step smaller, making the quantization step one step finer, or the like.

The PCM code length calculation unit 305 uses Equation 2 below to decide the code length of the PCM data output from the quantization unit 301 from the number of bits in the image data (10 bits in the present embodiment) and the QP.

$$\text{PCM code length}=\text{number of bits of image data}-\text{QP} \qquad \text{(Equation 2)}$$

In the present embodiment, whenever the value of QP is increased by 1, the PCM data code length is decreased by 1 bit. Accordingly, with an initial value of QP=0, whenever the QP is increased by 1, the code length of the PCM data is made shorter from the 10 bits by 1 bit. Here, the PCM code length is a fixed value because the value of QP is assigned fixedly for each of the encoding units 111A-111D in the provisional encoding system 110. Accordingly, configuration may be taken in which rather than the PCM code length calculation unit 305 calculating the PCM code length by a calculation with Equation 2, a fixed value for the PCM code length based on the value of the assigned QP is held and output. The PCM code length calculation unit 305 outputs the decided PCM code lengths to each of the code length comparison unit 306 and a selector 308.

Next, explanation is given for operation of the prediction unit 302. The prediction unit 302, as is illustrated in FIG. 3, is configured to include an inverse quantization unit 310, a pixel delay unit 311 and a quantization unit 312. After the PCM data that is inputted into the prediction unit 302 is temporarily inverse quantized by the inverse quantization unit 310, it is inputted into the pixel delay unit 311. In inverse quantization processing in the inverse quantization unit 310, the QP that the quantization unit 301 used for the image data quantization is used unchanged. The pixel delay unit 311 delays by a color component amount so that a previous value of the same color component becomes prediction data.

For example, in the present embodiment, as illustrated in FIG. 4A or FIG. 4B, for the image data of each color component of RGB is input in order. In the case of FIG. 4A, after encoding the image data G0, the image data of B0 and R1 is first encoded before the next G1 is encoded. Thus, the pixel delay unit 311 causes 3 pixels worth of delay, and outputs the held image data that is inverse quantized to the quantization unit 312 at a timing at which G1 is encoded. The quantization unit 312 quantizes image data inputted from the pixel delay unit 311. At this point, because the QP that the quantization unit 301 uses when quantizing the image data G1 is inputted into the quantization unit 312, the quantization steps match between the quantization unit 301 and the quantization unit 312. A configuration that re-quantizes after the inverse quantization is performed in the prediction unit 302 is a configuration that is necessary to cause the quantization steps to match if the values of the QP differ between pixels, and that is necessary in the actual encoding system 120. On the other hand, because the QP is fixed in the provisional encoding system 110, the inverse quantization unit 310 and the quantization unit 312 may be omitted, leaving only the pixel delay unit 311. The quantization result in the quantization unit 312 is outputted to the subtractor 303 as prediction data. Note that because no previous pixel exists for the first pixel (R0, G0, B0) of the encoding block of each color component, a value of 0 is outputted as the prediction data.

The subtractor 303 outputs to the variable length encoding unit 304 a differential between the PCM data from the quantization unit 301 and the prediction data from the prediction unit 302 as prediction difference data. The prediction difference data is data that has a positive or negative value, and becomes a value close to 0 at level portions for which changes in the image data are small, and becomes a large value at an edge portion for which a change is large. The prediction difference data has a characteristic of a Laplace distribution centered at 0, generally.

The variable length encoding unit 304 performs encoding by a predetermined variable length encoding scheme on the inputted prediction difference data, and outputs code data and a code length for each pixel. The code data is outputted to the selector 307, and the code length is outputted to the code length comparison unit 306 and the selector 308 respectively. Huffman coding and Golomb coding, for example, are encompassed in the predetermined variable length encoding scheme. By the variable length encoding scheme that the variable length encoding unit 304 executes, code data of a shortest code length is assigned if the input value is 0, and the larger the absolute value of the input value becomes, the longer the code length of the code data becomes. Note that in the present embodiment, code data outputted from the variable length encoding unit 304 is referred to as DPCM data, and the code length of the same is referred to as a DPCM code length.

The code length comparison unit 306 compares the PCM code length and the DPCM code length in a pixel group unit as previously explained to generate a PCM/DPCM selection flag for selecting code data whose code length becomes smaller. The code length comparison unit 306 is configured so to hold a DPCM code length and a PCM code length of each color of R, G and B which configure a pixel group. The PCM/DPCM selection flag is output to the selector 307 and the selector 308, and is used for switching of output data by each selector. It is also output to the outside of the encoding unit 111.

The comparison of code lengths is performed in a pixel group unit as previously described. The comparison of code lengths in a pixel group unit specifically calculates as follows. Here, an example of execution for the data input of an RGB component format of FIG. 4A where the pixel of the group number 1 is made to be the target is illustrated.

S_PCM_R1: the PCM code length of R1
S_PCM_G1: the PCM code length of G1
S_PCM_B1: the PCM code length of B1
S_DPCM_R1: the DPCM code length of R1
S_DPCM_G1: the DPCM code length of G1
S_DPCM_B1: the DPCM code length of B1
PCM_DPCM_SEL_FLAG: the PCM/DPCM selection flag
S_PCM=S_PCM_R1+S_PCM_G1+S_PCM_B1
S_DPCM=S_DPCM_R1+S_DPCM_G1+S_DPCM_B1
if (S_PCM>S_DPCM)
PCM_DPCM_SEL_FLAG=1
else
PCM_DPCM_SEL_FLAG=0

For each pixel group, the code length comparison unit 306 totals the PCM code lengths and the DPCM code lengths to calculate group code length totals (S_PCM, S_DPCM). Next, it compares these, and if the total of the PCM code lengths is larger it sets a flag value to 1, and if the total of the DPCM code lengths is larger it sets the flag value to 0.

The PCM data and the DPCM data are inputted into the selector 307, and the code data whose code length is smaller is selected in accordance with the PCM/DPCM selection flag, and output to the outside of the encoding unit 111. Specifically, if the flag value of the PCM/DPCM selection flag is 1, the DPCM data is selected because the total of the DPCM code lengths is smaller; if the flag value is 0, the PCM data is selected because the total of the PCM code lengths is smaller. A PCM code length and a DPCM code length are inputted into the selector 308, and the code length whose code length is smaller is selected in accordance with the PCM/DPCM selection flag, and output to the outside of the encoding unit 111. Specifically, if the flag value of the PCM/DPCM selection flag is 1, the DPCM code length is selected; if the flag value is 0, the PCM code length is selected.

(Explanation of the Provisional Encoding System)

Returning to the explanation of the image encoding unit 20 of FIG. 1B, explanation is given for provisional encoding processing in the provisional encoding system 110. For the image data inputted into the provisional encoding system 110 of FIG. 1B, provisional encoding is performed with the QP as 0-3 respectively by each of the plurality of encoding units 111A-111D, and the code lengths are outputted to the QP deciding unit 115. These code lengths represent code lengths of code data into which the result of quantization that performed the quantization processing by the quantization step corresponding to the respective QP is encoded in PCM or DPCM. The encoding units 111A-111D have the configuration illustrated in FIG. 3, and code data, a code length, and a PCM/DPCM selection flag are present as an output signal; however, configuration may be taken to only use the code length in the provisional encoding system 110, and not use the code data or the PCM/DPCM selection flag.

Additionally, because the QP range used for encoding in the present embodiment is made to be 0-3, the provisional encoding system 110 is equipped with four of the encoding unit 111, but embodiments of the invention are not limited to this configuration, and it is possible to change the number of the encoding unit 111 in accordance with the QP range used for encoding.

The QP deciding unit 115 decides the QP (application QP) to apply to a pixel group unit based on information of a plurality of code lengths for each QP input from the encoding units 111A-111D of the previous stage. Hereinafter, explanation is given of details of a method for deciding the application QP in the QP deciding unit 115.

Figure 5:
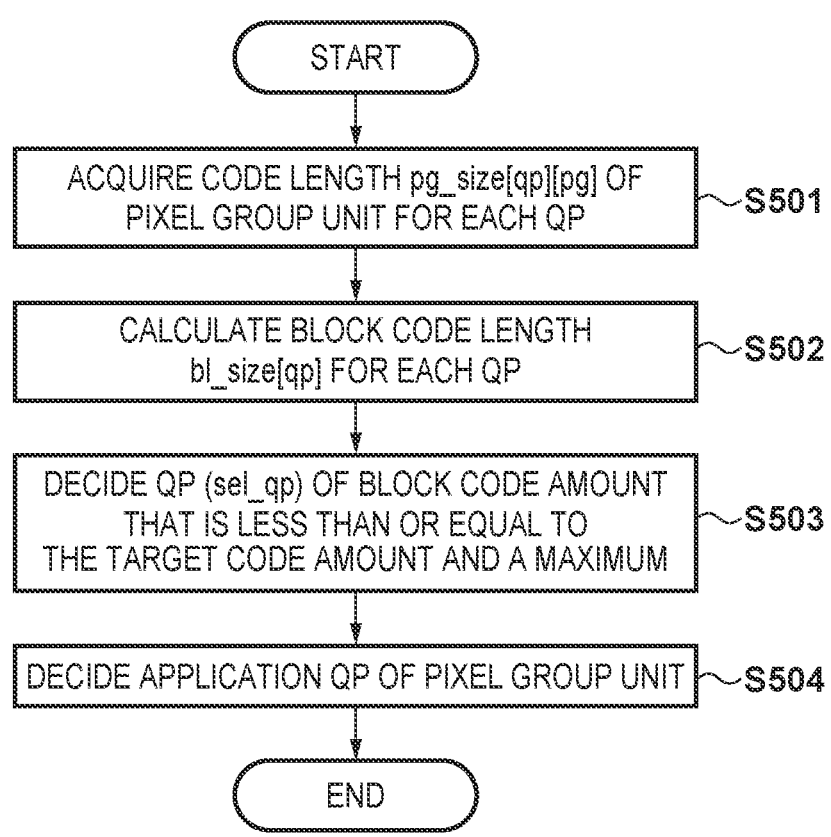
FIG. 5 is a flowchart that illustrates an example of a process in a QP deciding unit 115 corresponding to an embodiment of the invention.

In the present embodiment, using FIG. 5, explanation is given of an overview of a processing procedure that the QP deciding unit 115 executes. When this processing in FIG. 5 is started for each encoding block, the QP deciding unit 115, in step S501, acquires, for a pixel group unit, code length information calculated for each QP assigned to a respective encoding unit from the encoding units 111A-111D. Hereinafter, the code length of the code data that is acquired will be represented as pg_size[qp][pg] whose elements are the value of QP: qp and the pixel group number: pg. qp takes a value from 0 to 3, and pg takes a value from 0 to 15.

Next, the QP deciding unit 115, in step S502, calculates the total code lengths of the encoding block for each QP. It is necessary to consider the code length of the header information which is multiplexed in the encoded data when calculating the code length of the encoding block overall. The header information is information of the PCM/DPCM selection flag and QP for each pixel group that is necessary for when decoding; in the present embodiment, the code length of the header information is a total of 48 bits: 2 bits to represent the QP (0-3)×16 pixel groups=32 bits, and 1 bit for the PCM/DPCM selection flag×16 pixel groups=16 bits. Here, because the code length of the header information can be predicted in advance as a fixed value irrespective of the value of the image data or the QP, the code length of the encoding block may be calculated excluding the code length of the header information.

A calculation of a block code length bl_size[qp] that adds a total of the code lengths of all pixel groups and the code length hd_size (=48 bits) of the header information is performed. FIG. 8A and FIG. 8C illustrate a specific example of values of pg_size[qp][pg] and bl_size[qp]. FIG. 8A corresponds to the positive order input of FIG. 4A, and FIG. 8C corresponds to the reverse order input of FIG. 4B. In FIG. 8C, the pixel group numbers are in descending order from 15 to 0 going left to right, but this is for explaining the reverse order, and the pixel group numbers are assigned 0 to 15 from the left similarly to FIG. 8A. In FIG. 8A, a value (30) that a reference numeral 801 indicates, for example, is pg_size[0][0], and indicates the code length for the case where the head pixel group in the encoding block is encoded with the QP=0. Similarly, a value (18) that a reference numeral 802 indicates, for example, is pg_size[0][15], and indicates the code length for the case where the final pixel group in the encoding block is encoded with the QP=0. Also, a value that a reference numeral 803 indicates (382) is bl_size[0], and indicates a block code length in a case of encoding with QP=0; a value that a reference numeral 804 indicates (293) is bl_size[3], and indicates a block code length in the case of encoding with QP=3. These values are represented in units of bits. Explanation is given using the values of this figure as an example of specific values in the explanation that follows as well. The same is true for FIG. 8C.

Figure 6:
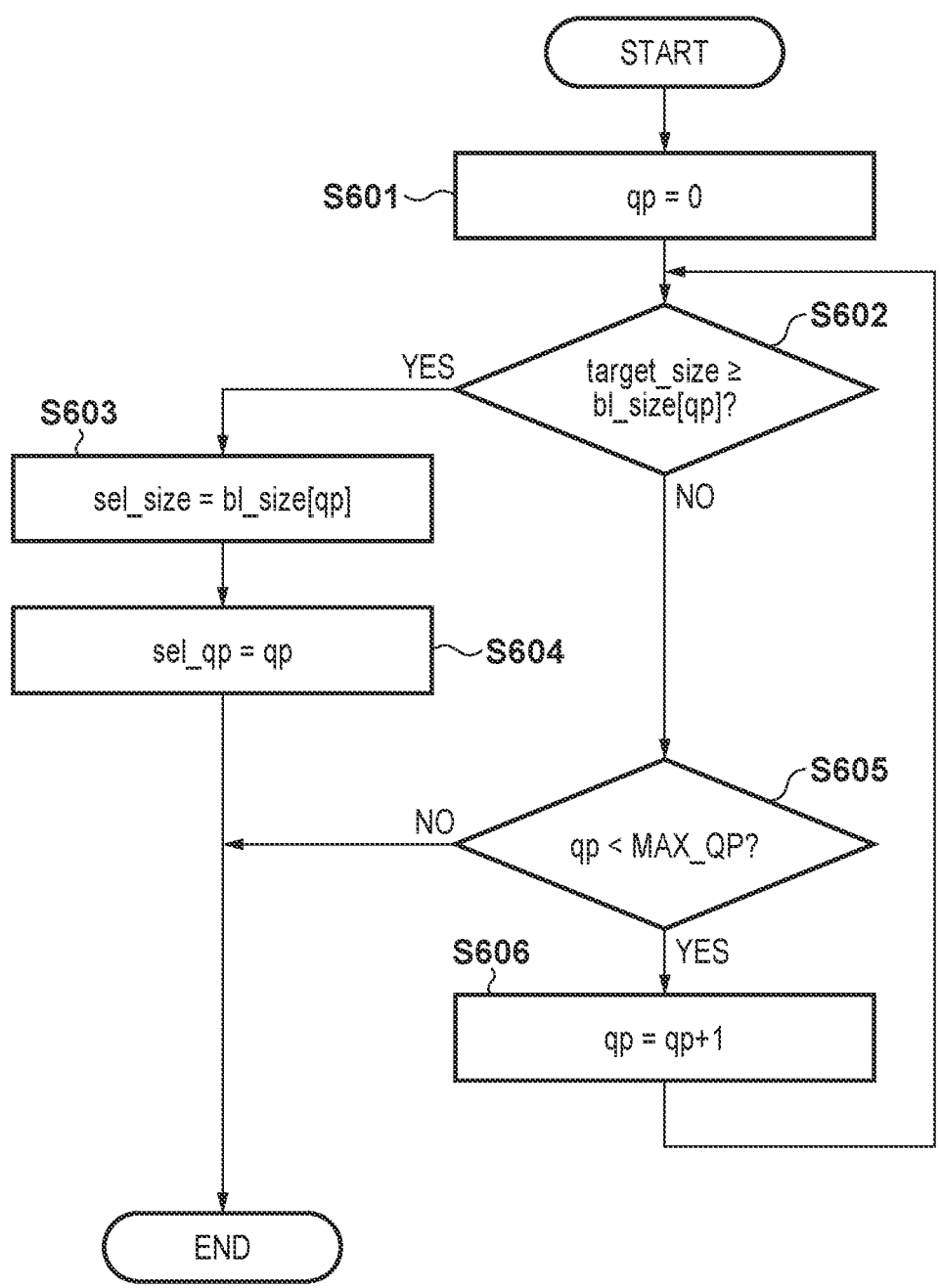
FIG. 6 is a flowchart that illustrates an example of processing of step S503 of FIG. 5.

Next, the QP deciding unit 115, in step S503, selects from bl_size[qp] into sel_size a block code length that is less than or equal to a predetermined target code amount target_size and that has a maximum value, and selects into sel_qp the qp in that case. The specific processing in step S503 is as is illustrated in the flowchart of FIG. 6.

First, in step S601, the QP deciding unit 115 initializes the value of QP: qp to 0. Next, the QP deciding unit 115, in step S602, compares the code length of an encoding block for the currently selected QP: bl_size[qp] and the target code amount: target_size. If the result of the comparison is that bl_size[qp] is less than or equal to target_size ("YES" in step S602), transition is made to step S603; if bl_size[qp] is larger than target_size ("NO" in step S602), transition is made to step S605.

In step S603, bl_size[qp] that became the determination target in step S602 is set to be the block code length sel_size that should be selected. Next, in step S604, a value of the QP of bl_size[qp] is set to be sel_qp which represents a provisional QP of the encoding block, and the processing terminates.

In step S605, it is determined whether or not the value of the QP that is currently selected is smaller than the maximum value (MAX_QP); if it is smaller than the maximum value ("YES" in step S605), the value of QP is updated by 1 in step S606, step S602 is returned to, and the processing continues. If the current value of QP is greater than or equal to the maximum value ("NO" in step S605), the processing terminates. In the present embodiment, the value of MAX_QP is 3. Note that no block code length that is smaller than the target code amount exists and a QP cannot be selected if NO is determined in step S605. However, in reality, it is possible to design so that a block code length that falls below the target code amount between the minimum value and the maximum value for QP is obtained by adjusting the value of the target code amount and the QP setting range in advance based on the number of bits of image data.

In this fashion, the code length of the encoding block is compared with the target code amount in order while increasing the quantization step from 1 to 2, and 2 to 4 by updating by 1 each time from the initial value of QP=0. Then it is possible to make the first value of QP corresponding to the block code length that is less than or equal to the target code amount be the provisional QP value. Explanation is given having the specific value of the target code amount target_size be 360 bits explanatorily in the present embodiment. Because the information amount of the image data prior to encoding is 10 bits×3×16=480 bits, this value corresponds to ¾ of that. The size of the target code amount can be set optionally in accordance with a compression rate that is expected. In the example illustrated in FIG. 8A and FIG. 8C, 326 (bits), which is the block code length bl_size [2] where QP: 2, is less than the target code amount of 360 bits, it is selected as sel_size. Also, the value 2 of QP here is set to be sel_qp. Here, if the code length of the header information is not included in the code length of the encoding block, the value of the target code amount becomes a value into which the code length of the header information is subtracted from 360 bits. Because in the above-described example the code length of the header is 48 bits, the target code amount in such a case becomes 312 bits.

Returning to the explanation of FIG. 5, the QP deciding unit 115, in step S504, performs a pixel group unit adjustment with respect to the provisional QP value sel_qp of the encoding block decided in step S503. With this, it is possible to decide the application QP: pg_qp[pg] for pixel group units. Detail of the processing for deciding pg_qp[pg] in step S504 is explained in detail with reference to the flowchart of FIG. 7.

In FIG. 7, the QP deciding unit 115, in step S701, initializes pg_qp[pg] which is the application QP for a pixel group unit with QP: sel_qp decided in step S503. Here all of pg_qp[0]-pg_qp[15] are initialized to the value of sel_qp. In the examples of FIG. 8A and FIG. 8C, because the QP=2 is selected, pg_qp[0]-pg_qp[15] are all initialized to 2. Next, in step S702, the QP deciding unit 115 initializes a parameter new_size which represents a code length of the encoding block at the current time to the value of sel_size decided in step S603. For example, in the example of FIG. 8A and FIG. 8C, the value of new_size is initialized to 326 in step S702 because sel_size is decided to be a block code length 326 when QP is 2. The block code length becomes 278 if the header code length is not considered. Next, the QP deciding unit 115, in step S703, initializes the value of the parameter qp which indicates the currently selected QP with the value of sel_qp decided in step S604. For example, in the examples of FIG. 8A and FIG. 8C, the value of qp is initialized to 2 in step S703 because sel_qp is decided to be 2.

Next, the QP deciding unit 115, in step S704, initializes the value of a parameter new_qp which indicates a new QP with a value that reduces qp by 1. new_qp indicates a value that lowers the value of qp that is currently selected by 1. Furthermore, in step S705, the QP deciding unit 115 initializes a parameter pg indicating a number of the pixel group that is the target of processing. Because for pixel groups there are 16 groups from 0 to 15, initialization of pg=0 is performed. Furthermore, the QP deciding unit 115, in step S706 and in step S707, sets minus_size to pg_size[qp][pg], and sets plus_size to pg_size[new_qp] [pg]. Here, minus_size indicates a code length of selected pixel group based on the current qp value, and plus_size indicates a code length of a selected pixel group based on the value of new_qp which reduces the current qp by 1. For example, in a case in which pg=0 and qp=2 is considered, minus_size becomes 24 and plus_size becomes 27 in the example illustrated in FIG. 8A. In the example illustrated in FIG. 8C, minus_size is 16, and plus_size is 18. These minus_size and plus_size are used to calculate the amount of change in the block code length of an encoding block expected in a case where qp is changed by only 1 for a pixel group unit.

In step S708, the QP deciding unit 115 obtains a parameter tmp_size which indicates a block code length in a case where qp is changed by 1 for a pixel group unit by Equation 3 from the foregoing new_size, minus_size and plus_size.

$$tmp\_size = new\_size - minus\_size + plus\_size \quad \text{(Equation 3)}$$

For example, if a case where pg=0 and qp=2 is considered, tmp_size=329 because new_size=326, minus_size=24, and plus_size=27 in the example of FIG. 8A. Similarly, in the example of FIG. 8C, new_size=326, minus_size=16, and plus_size=18, and therefore tmp_size=328.

Next, the QP deciding unit 115, in step S709, determines whether or not tmp_size which is the code length for after qp changes and is obtained in step S708 is less than or equal to the target code amount (target_size). If the value of tmp_size exceeds the target code amount ("NO" in step S709), transition is made to step S714. Meanwhile, if the value of tmp_size is less than or equal to the target code amount ("YES" in step S709), transition is made to step S710. In step S710, the QP deciding unit 115 updates the value of new_size with the value of tmp_size. Next, in step S711, the QP deciding unit 115 updates the application QP: pg_qp[pg] of the pixel group which is the target of processing with the value of new_qp. After that, in the processing of step S712 and step S713, the pixel group that is the target of processing is updated. Specifically, in step S712, the QP deciding unit 115 determines whether or not the number pg of the pixel group of the current target of processing is smaller than the maximum value (MAX_PG) for a pixel group number. The value of MAX_PG is 15 in the case of the present embodiment. Here, if pg is smaller than the maximum value ("YES" in step S712), transition is made to step S713, the QP deciding unit 115 updates pg by 1, and processing for deciding the application QP: pg_qp[pg] in a pixel group unit is performed for a new pixel group after returning to step S706. Meanwhile, if pg matches a maximum value ("NO" in step S713), transition is made to step S714.

Next, in step S714, the QP deciding unit 115 determines whether or not the current qp value is larger than 0, and determines whether or not a value that subtracts the current qp from sel_qp is smaller than MAX_DIFF. MAX_DIFF defines a number of times that it is possible to lower qp from sel_qp. MAX_DIFF can be decided optionally in accordance with a range of values that QP takes, and can be made to be 2, for example; in such a case, it is possible to lower the value of qp from the value of sel_qp up to 2 times. Because sel_qp=2 in the foregoing example, it is possible to perform processing until qp=0. Hypothetically, if sel_qp=3, it would be possible to reduce until qp=1, but it would not be possible to reduce until qp=0. Also, MAX_DIFF may be made to be 1 or 3. Restricting the number of times in this fashion is for restricting the recursive processing execution time. By setting MAX_DIFF, it is possible to define the number of types of QP that can be included in the application QP by adding to sel_qp.

If, in step S714, qp is 0 or if the number of times that qp was lowered matches MAX_DIFF ("NO" in step S714), the QP deciding unit 115 terminates this processing. If qp is larger than 0 and the number of times that qp was lowered does not reach MAX_DIFF ("YES" in step S714), transition is made to step S715. In step S715, the QP deciding unit 115 reduces the value of qp by 1, step S704 is returned to, and the processing repeats. The application QP decided in this fashion is outputted from the QP deciding unit 115 to the actual encoding system 120.

Here, a concrete example of the process in FIG. 7 will be explained with reference to FIG. 8A for the case of the positive order input of FIG. 4A. First, based on the selected sel_size (326 in the example of FIG. 8A), the block code length (326−24+27=329) in a case where the value of QP of the pixel group of the pixel group number 0 is made smaller by 1 is calculated, and compared with the target code amount (360). If the calculated block code length is less than or equal to the target code amount, a block code length for a case where the QP of the subsequent pixel group number 1 is made smaller by 1 is calculated, and compared with the target code amount similarly. The block code length of the pixel group number 1 calculated here is (329−24+27=332), which is smaller than the target code amount. In this fashion, block code lengths are calculated by selecting pixel groups in order as follows.

Pixel group number 2: 332−24+27=335
Pixel group number 3: 335−18+22=339
Pixel group number 4: 339−19+23=343
Pixel group number 5: 343−15+18=346
Pixel group number 6: 346−13+15=348
Pixel group number 7: 348−13+15=350
Pixel group number 8: 350−16+16=350
Pixel group number 9: 350−18+22=354
Pixel group number 10: 354−17+17=354
Pixel group number 11: 354−15+18=357
Pixel group number 12: 357−12+12=357
Pixel group number 13: 357−16+20=361

In the foregoing calculated block code length, a block code length of a pixel group number 13 exceeds the target code amount. Accordingly, after this, the pixel group number 0 is returned to once again, the value of QP is caused to be further decreased by 1, and the block code length is calculated similarly. However, if MAX_DIFF=1, processing terminates at this point in time.

Pixel group number 0: 357−27+30=360
Pixel group number 1: 360−27+30=363

Here, the target code amount is exceeded for the pixel group number 1. Because the value of qp at this point in time is 0, the processing terminates. Specific values for the application QP that are decided in this way are illustrated in FIG. 8B. In FIG. 8B, the QPs corresponding to the code lengths surrounded in the bold lines represent the application QPs decided for each pixel group. For each value of the application QP of a pixel group unit, pg_qp[0] is 0, pg_qp [1-12] is 1, and pg_qp[13-15] is 2. In this fashion, in the present embodiment, a QP that is smaller is assigned according to the order from the head pixel group. While the QP=0 is assigned for only the head pixel group in FIG. 8B, it is possible to assign a minimum QP to a plurality of pixel groups that are consecutive including the head pixel group under another condition.

Next, a concrete example of the process in FIG. 7 will be explained with reference to FIG. 8C for the case of the reverse order input of FIG. 4B. Based on the selected sel_size (326 in the example of FIG. 8C), firstly the block code length (326−16+18=328) in the case where the value of QP of the pixel group of the pixel group number 0 (15 in the positive order prior to the scan conversion, same below) is made to be 1 smaller is calculated, and compared with the target code amount (360). If the calculated block code length is less than or equal to the target code amount, a block code length for a case where the QP of the subsequent pixel group number 1 (14) is made smaller by 1 is calculated, and compared with the target code amount similarly. The block code length of the pixel group number 1 calculated here is (328−18+18=328), which is smaller than the target code amount. In this fashion, block code lengths are calculated by selecting pixel groups in order as follows.

Pixel group number 2 (13): 328−16+20=332
Pixel group number 3 (12): 332−12+12=332
Pixel group number 4 (11): 332−15+18=335
Pixel group number 5 (10): 335−17+17=335
Pixel group number 6 (9): 335−18+22=339
Pixel group number 7 (8): 339−16+16=339
Pixel group number 8 (7): 339−13+15=341
Pixel group number 9 (6): 341−13+15=343
Pixel group number 10 (5): 343−15+18=346
Pixel group number 11 (4): 346−19+23=350
Pixel group number 12 (3): 350−18+22=354
Pixel group number 13 (2): 354−24+27=357
Pixel group number 14 (1): 357−24+27=360
Pixel group number 15 (0): 360−24+27=363

In the foregoing calculated block code length, a block code length of pixel group number 15 (0) exceeds the target code amount. Accordingly, after this, the pixel group number 0 is returned to once again, the value of QP is caused to be further decreased by 1, and the block code length is calculated similarly. However, if MAX_DIFF=1, processing terminates at this point in time.

Pixel group number 0 (15): 360−18+18=360
Pixel group number 1 (14): 360−18+18=360
Pixel group number 2 (13): 360−20+20=360
Pixel group number 3 (12): 360−12+12=360
Pixel group number 4 (11): 360−18+22=364

Here, the target code amount is exceeded for the pixel group number 4 (11). Because the value of qp at this point in time is 0, the processing terminates. Specific values for the application QP that are decided in this way are illustrated in FIG. 8D. In FIG. 8D, the QPs corresponding to the code lengths surrounded in the bold lines represent the application QPs decided for each pixel group. For each value of the application QP of a pixel group unit, pg_qp[0-3 (15-12)] is 0, pg_qp[4-14 (11-1)] is 1, and pg_qp[15 (0)] is 2. In the foregoing example, explanation is given for a case that considers a code length of header information; in cases where the code length of the header information is not considered, the 48 bits code length of the header information can be subtracted from the foregoing numerical value as appropriate.

As explained above, in the present embodiment, it is possible to change the QP to a smaller value in order from the head pixel group within a range in which the total encoded data amount of the block does not exceed the target code amount in the method of deciding an application QP of a pixel group unit of step S504 in the QP deciding unit 115. Also, in the present embodiment, for image data input into the provisional encoding system and the actual encoding system, the scan order is reversed between odd-numbered blocks and even-numbered blocks of each line in advance.

Figure 9A:
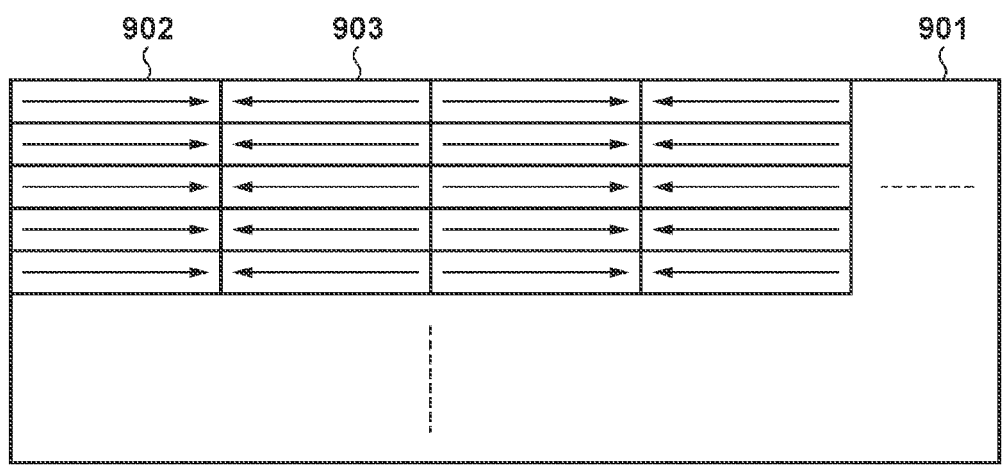
FIG. 9A and FIG. 9B are views for explaining a scan conversion corresponding to an embodiment of the invention.

FIG. 9A is a schematic diagram illustrating a processing order in the provisional encoding system 110 and the actual encoding system 120. in FIG. 9A, image data 901 is configured by a plurality of encoding blocks 902 and 903. The encoding blocks 902 indicate the odd-numbered encoding blocks, and the encoding blocks 903 indicate the even-numbered encoding blocks. The arrow symbols in each encoding block represent the processing order of encoding. Here, for the odd-numbered blocks 902, encoding processing is performed from left to right, and for the even-numbered blocks 903, encoding processing is performed from right to left in the reverse order.

In this way, by changing the processing order alternatingly for each block, the direction that the QP value in the blocks changes alternatingly in the respective blocks. In the present embodiment, the closer a block is to being processed first among the blocks, the smaller the QP that is assigned. For this reason, the value of QP changes from the smallest value to the largest value in the respective blocks. Meanwhile, by alternatingly changing the processing target pixel order every block, for example the value of QP changes from smaller values to larger values in odd-numbered blocks, and the value of QP changes from larger values to smaller values in even-numbered blocks. An example of such a change in QP is illustrated in FIG. 9B.

Figure 9B:
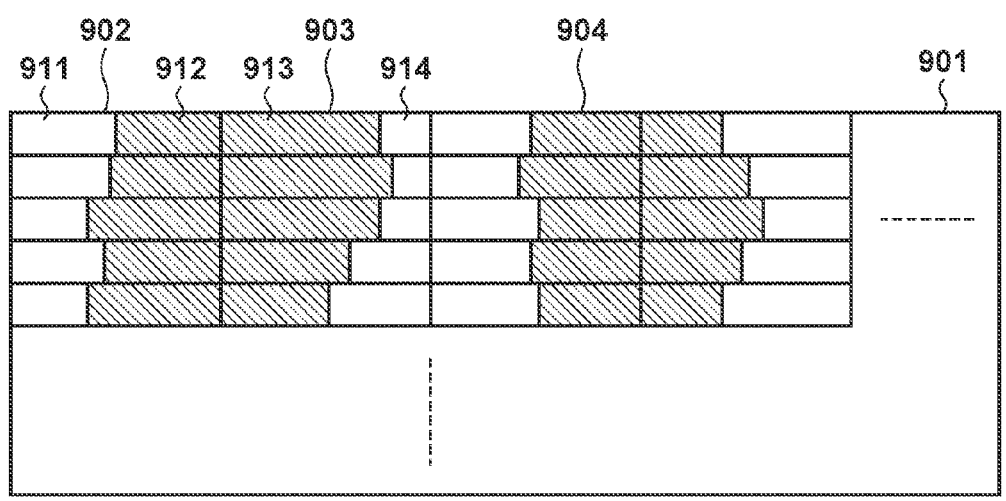

FIG. 9B is a schematic diagram illustrating an example of QP values in blocks. In this figure, the image data 901 is configured by a plurality of encoding blocks 902 and 903. Because the odd-numbered block 902 is encoded without the scan conversion, a pixel group 911 of the first half illustrated as plain is encoded by the first QP value (for example, 2), and a pixel group 912 of the second half illustrated with diagonal lines is encoded by the second QP value (for example, 3). On the other hand, in the even-numbered block 903, a scan conversion and an encoding in reverse order are performed. For this reason, the head pixel in the input order in the block is processed last in the encoding processing, and the final pixel in the input order in the block is processed first in the encoding processing. The earlier that a pixel group is processed in the order that is converted in this fashion, the smaller the value of the QP that is assigned. When, after encoding in this way, the order of the pixels of the blocks are returned to the original order, a pixel group 913 of the first half illustrated with diagonal lines is encoded by the second QP value, and a pixel group 914 of the second half illustrated as plain is encoded by the first QP value. For this reason, the QPs of the pixel groups adjacent to the boundary portion between the block 902 and the block 903 both become the second QP value, and no difference in QP values occurs at the boundary portion. The same is configured for other blocks as well, and the first QP values and the second QP values are respectively illustrated as plain and with diagonal lines. For this reason, the QPs of the pixel groups adjacent to the boundary portion between the block 903 and the block 904 both become the first QP value, and no difference in QP values occurs at the boundary portion. In a natural image, often adjacent blocks are of similar pictures, and a distribution of such QP values is effective because there are often cases of the same QP value.

In this way, by alternatingly changing the processing order every block, the difference in QP values of the boundary portion of adjacent blocks is made smaller, and the image quality of the block boundary portion becomes uniform. With this, it is possible to decrease the block boundary being seen to be unnatural due to degradation of the block boundary portion.

Also, in the present embodiment, it is possible to cause the quality of the encoding result to improve while reducing as much as possible unused bits by adjusting QPs in a range in which the block code amount does not exceed a predetermined value in a direction that results in a high image quality. Because it is possible to increase the percentage that QP whose quantization step is small, and reduce the number of unused bits, it is possible to further decrease the degradation of image quality due to encoding.

(Explanation of the Actual Encoding System)

Next, explanation is given for operation of the actual encoding system 120 of FIG. 1B. The same image data as the image data input into the provisional encoding system 110 is input into the actual encoding system 120 as well, but it is necessary to wait for the QP deciding unit 115 of the provisional encoding system 110 to decide and output the application QP. Thus, the input image data is input into the delay unit 121, and a delay of a predetermined number of processing cycles worth that is necessary for the provisional encoding system 110 to decide the application QP is performed. The image data after the delay is outputted from the delay unit 121 to the encoding unit 111E. With this, the encoding unit 111E can encode the encoding block, for which the provisional encoding system 110 decided the application QP, using that decided application QP.

The encoding unit 111E has the same configuration as the encoding unit 111 illustrated in FIG. 3, and uses the application QP to perform actual encoding of the delayed image data. With this, code data of a code length that is the same as the block code length that the QP deciding unit 115 decided is generated, and output to the multiplexing unit 123 together with the PCM/DPCM selection flag and the code length. In the multiplexing unit 123, the code data, the code length and the PCM/DPCM selection flag from the encoding unit 111E, and the QP from the QP deciding unit 115 are inputted, and multiplexing is performed in a predetermined format for each encoding block.

Hereinafter, explanation is given using FIG. 10A for an example of a format corresponding to embodiments of the invention. FIG. 10A is a view that represents a data structure of an encoding format, and a numerical value indicated by parentheses represents the number of bits of data stored in each region. Encoded data 1001 (360 bits) of the whole of the block is configured from a header portion 1002 (48 bits) and a pixel data portion 1003 (312 bits). The header portion 1002 is comprised by a QP value portion 1004 (32 bits) that stores values of QP, and a flag portion 1005 (16 bits) that stores PCM/DPCM selection flags. Sixteen 2 bit QP (1004_0-1004_f) are stored for each pixel group in the QP value portion 1004. Sixteen 1 bit flag values for the PCM/DPCM selection flag (1005_0-1505_f) for each pixel group are stored in the flag portion 1005. The number of pixels worth (3×16=48 pixel's worth) of code data is stored in the pixel data portion 1003. The encoded data 1001 which is multiplexed is outputted as stream data to an output terminal 102, and image memory (not shown) is outputted to the bus interface.

(Explanation of Image Decoding Unit)

Figure 2:
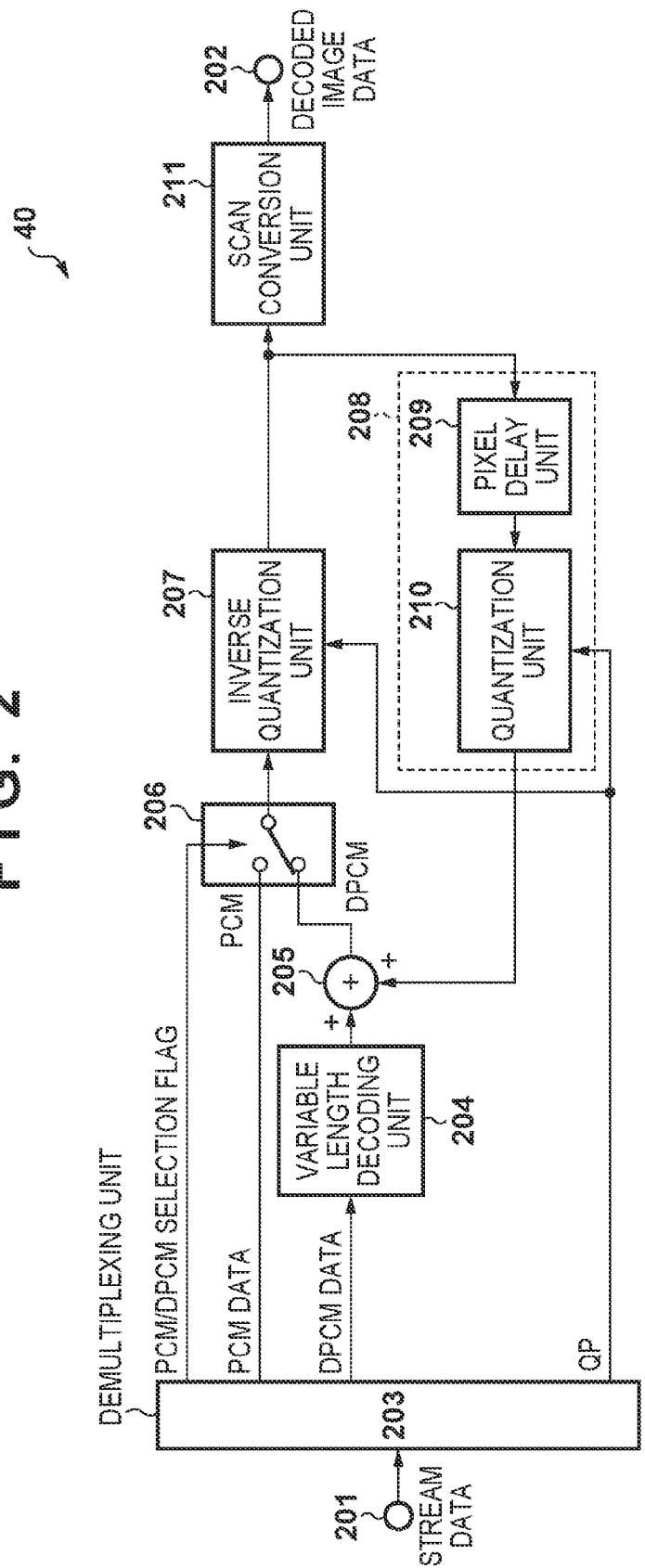
FIG. 2 is a block diagram for illustrating an example configuration of an image decoding unit corresponding to an embodiment of the invention.

Next, explanation is given for an example configuration and operation of an image decoding unit that corresponds to an embodiment of the invention and that decodes encoded data generated in the image encoding unit 20. FIG. 2 is a block diagram for illustrating an example configuration of the image decoding unit 40 corresponding to an embodiment of the invention. The image processing apparatus 100 has the image decoding unit 40, and can decode encoded data stored in the memory 30 thereby. Hereinafter, explanation is given for operation of each block in an example configuration of the image decoding unit of the present embodiment.

The image decoding unit 40 illustrated in FIG. 2 is comprised by a demultiplexing unit 203, a variable length decoding unit 204, an adder 205, a selector 206, an inverse quantization unit 207, and a prediction unit 208. The image decoding unit 40 may be configured integrally in hardware using memory, logic circuits and dedicated devices, or may be configured by distributing among a plurality of devices. Alternatively, they may be configured in software by a computer such as a CPU executing a processing program stored in a memory.

For the image decoding unit 40, stream data generated by the image encoding unit 20 is input into the demultiplexing unit 203 via an input terminal 201 by way of an image memory (not shown), a bus interface or the like. The demultiplexing unit 203 decodes the inputted stream data in accordance with a predetermined format, separates information of a QP, a PCM/DPCM selection flag and the code data, and outputs sequentially for each process cycle. The QP is outputted to the inverse quantization unit 207 and a quantization unit 210, and the PCM/DPCM selection flag is outputted to the selector 206. From the code data, PCM data is outputted to the selector 206, and DPCM data is outputted to the variable length decoding unit 204. The variable length decoding unit 204 performs variable-length decoding of inputted DPCM data, and outputs decoded DPCM data to the adder 205. The adder 205 obtains a decoding value by adding a prediction value from the prediction unit 208 which is explained later to the decoded DPCM data, and outputs to the selector 206.

The selector 206 switches PCM data from the demultiplexing unit 203 and a decoding value from the adder 205 in accordance with the PCM/DPCM selection flag, and outputs as quantization data, outputting to the inverse quantization unit 207. The inverse quantization unit 207 uses the QP value to inverse quantize the quantization data from the selector 206 to generate decoded image data, and outputs to the prediction unit 208 and an output terminal 202. The prediction unit 208 is configured by a pixel delay unit 209 and the quantization unit 210. Decoded image data inputted from the inverse quantization unit 207 is delayed by a color component's worth in the pixel delay unit 209, quantized in the quantization unit 210, and output as a prediction value so that the previous value of the same color component becomes the prediction value. Note that because no previous pixel exists for the first pixel of the encoding block of each color component, a value of 0 is outputted as the prediction value. Decoded image data outputted from the inverse quantization unit 207, via the output terminal 202, is outputted to the outside after being scan converted via a scan conversion unit 211.

The scan conversion unit 211 temporarily holds image data for each block, and for even-numbered blocks of each line, the scan order is inverted, and the blocks are output in a reverse order, while odd-numbered blocks are output without changing the scan order of the pixels. Outputting having inverted the scan order means the same as what is explained in relation to the scan conversion unit 130. With this, the scan order of blocks scan converted by the scan conversion unit 130 in the image encoding unit 20 is returned to what it originally was for output. The decoded image data returned to the original scan order is outputted to the outside via the output terminal 202.

As explained above, in the present embodiment, to perform encoding of a fixed length for each encoding target encoding block consisting of a plurality of pixel groups, firstly provisional encoding is performed with a plurality of QPs in the provisional encoding system to obtain encoded data amounts, and then the QP values to apply to pixel group units are decided from those encoded data amounts. A configuration is taken such that next, in the actual encoding system, actual encoding is performed using the application QPs that are decided. With this, it is possible to decide the value of the QPs so that the block code length of an encoding block becomes a maximum value that does not exceed the predetermined value. Also, because it is possible to make the value of QP be a smaller value in a range in which the code length does not exceed a predetermined value for each pixel group, it is possible to cause the image quality to improve in units of pixel groups. Also, by alternatingly changing the image encoding processing order every block, the difference in QP values of the boundary portion of adjacent blocks is made smaller, and the image quality of the block boundary portions becomes uniform. With this, it is possible to decrease the block boundary being seen to be unnatural due to degradation of the block boundary portion.

Also, configuration is taken in which the QP and PCM/DPCM selection flag used when encoding is selectable (switchable) for a pixel group unit. For PCM/DPCM selection, rather than setting PCM in a case where a differential is large and DPCM in a case where a differential is small in accordance with an adjacent pixel differential, configuration is taken to calculate code lengths for both PCM and DPCM in each pixel group and to select the encoding scheme for which the code length becomes smaller. With this, efficient encoding in units of blocks becomes possible.

Specifically, in the present embodiment, even if the differential between adjacent pixels becomes large, the code length is not forcibly made to be halved from 10 bits to 5 bits in the case of PCM encoding as in Japanese Patent Laid-Open No. 2010-004514. Instead, the shorter code length in the PCM and DPCM encoding results is selected for each pixel group using a plurality of quantization steps set in a stepwise fashion including a quantization step 1. Furthermore, because the quantization step is selected considering the block code length of encoding blocks and not just the code length of group units in the present embodiment, even if the code length in some of the pixel groups becomes large, that is cancelled out if other pixel group code lengths are small. Thus, even if a sharp edge is included within an encoding block and a large code length is expended by that edge component, if before and after the edge is level, the portion of the code length of that edge will be absorbed thereby, and therefore there ceases to be a need to reduce bits unnecessarily when encoding edge components as in Japanese Patent Laid-Open No. 2010-004514.

In the embodiment of the invention described above, the number of bits of the image data is not limited to 10 bits, and may be a different number of bits such as 8 bits or 12 bits. Also, the block size is not limited to 16 horizontal pixels×1 vertical pixel, and may be any size. For example, it may be made to be a two-dimensional structure such as 4 horizontal pixels×4 vertical pixels.

Furthermore, the format of the encoding target image data is not limited to RGB image data, and may be an image data format such as one for gray-scale images, or for color images, YCbCr or Bayer array data. FIG. 4C illustrates a relationship between pixel groups and pixel data that configures encoding blocks in a case where the image data format is YCbCr4:2:2 with a luminance signal (Y) and two color-difference signals (Cr and Cb). In FIG. 4C, an example is illustrated in which a total of 4 pixels—2 pixels for Y and 1 pixel each for Cb and Cr—is made to be a unit pixel group, and an encoding block is configured from 4×8=32 pixels. Here, the number of pixel groups included in an encoding block may be more than 8 groups. FIG. 4D illustrates a relationship between pixel groups and pixel data that configures encoding blocks in a case where the image data format is a Bayer arrangement. In FIG. 4D, an example is illustrated in which a total of 4 pixels—2 pixels for Y and 1 pixel each for Cb and Cr—is made to be a unit pixel group, and an encoding block is configured from 4×8=32 pixels. Here, the number of pixel groups included in an encoding block may be more than 8 groups. For a gray-scale image, it is possible to configure a pixel group from a set of adjacent pixels among the pixels that configure the gray-scale image (not shown). In such a case, it is possible to include adjacent pixels, for example 3 pixels or 4 pixels, in a unit pixel group.

Second Embodiment

Next, explanation is given of another embodiment of the invention. A point of difference between the second embodiment and the above described first embodiment is in the processing internal to the QP deciding unit 115 of the image encoding unit 20, and configuration and operation of other encoding units, delay units and multiplexing units is the same as in the first embodiment, and thus explanation is omitted.

Figure 11:
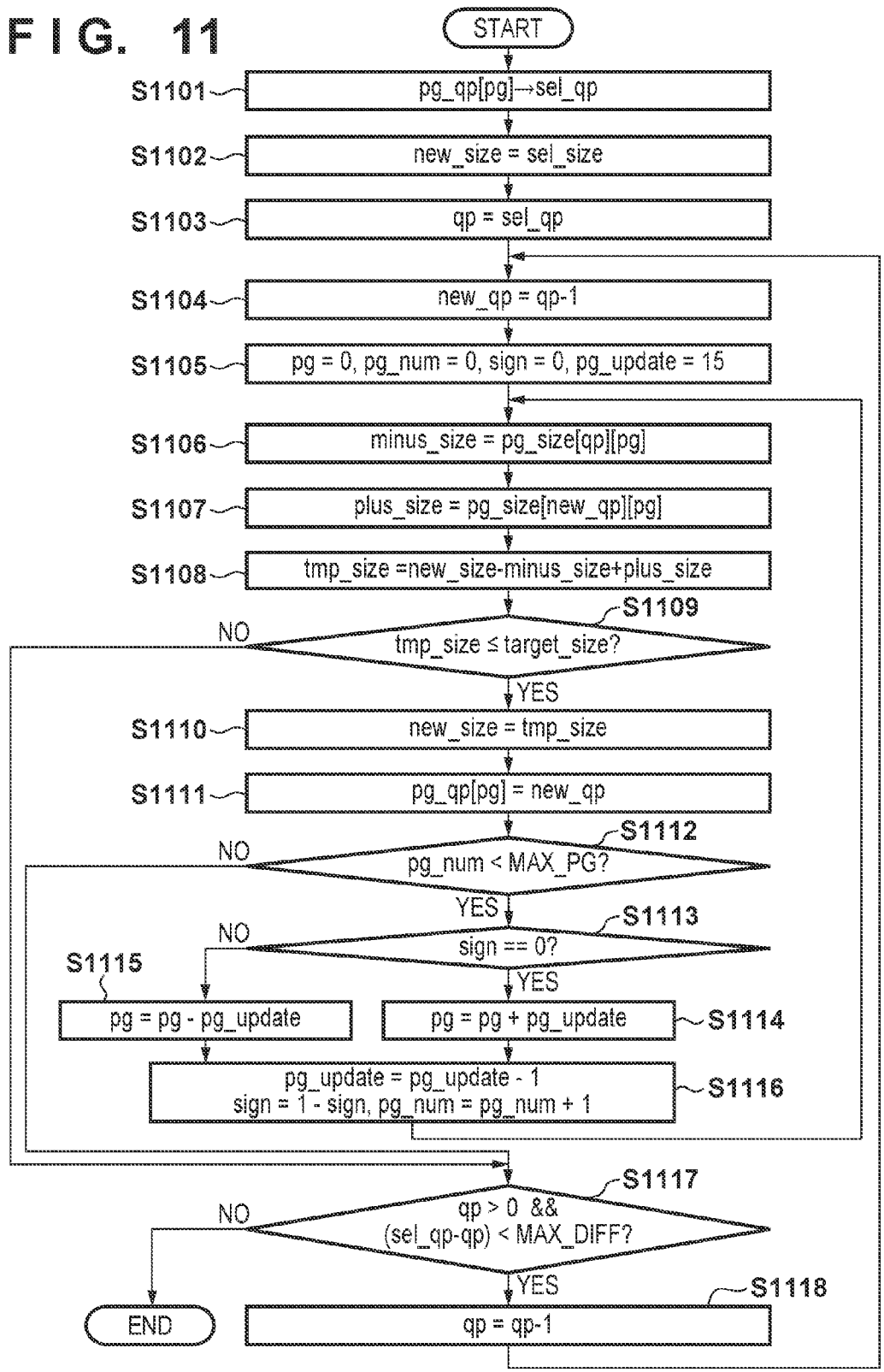
FIG. 11 is a flowchart that illustrates another example of processing of step S504 of FIG. 5.

In this embodiment, an outline of a processing procedure of the QP deciding unit 115 is essentially the same as what is illustrated in FIG. 5 and FIG. 6. However, in the present embodiment, the method of deciding the application QP of a pixel group unit in step S504 differs to in the first embodiment. Detail of the processing corresponding to the present embodiment is as is illustrated in the flowchart of FIG. 11. The flowchart of FIG. 11 is a variation of the flowchart of FIG. 7, and three new parameters called pg_num, sign, and pg_update have been added, and a portion of the processing is different in conjunction with this.

In FIG. 11, the processing from step S1101 to step S1104 is the same as from step S701 to step S704. In step S1105, the QP deciding unit 115 initializes a parameter pg indicating the number of the pixel group that is the target of processing to 0. Also, pg_num which indicates the number of pixel groups already processed is initialized to 0, and sign (the sign) which is for switching the pg updating approach is initialized to 0. Also, pg_update which is used to switch the processing target pixel group is initialized to 15.

The processing after that from step S1106 to step S1111 is the same as the processing from step S706 to step S711. In the subsequent processing of step S1112, the QP deciding unit 115 determines whether or not pg_num, which indicates the current processed pixel group number, is smaller than the maximum value (MAX_PG) for a pixel group number. The value of MAX_PG is 15 in the case of the present embodiment. If pg_num is smaller than the maximum value here ("YES" in step S1112), transition is made to step S1113, and if pg_num matches the maximum value ("NO" in step S1112), transition is made to step S1117. In step S1113, the QP deciding unit 115 determines whether or not sign is 0. If sign is 0 ("YES" in step S1113), transition is made to step S1114, and if sign is 1 ("NO" in step S1113), transition is made to step S1115. Here, when sign has the value of 0, it means that the processing target pixel group is closer to the head of the block, and when sign has the value of 1, it means that the processing target pixel group is closer to the tail of the block. In the present embodiment, there is the feature that the processing target pixel group is switched alternatingly between the head side and the tail side, and sign is used for that switching.

In step S1114, the value of pg_update is added to the parameter pg which indicates the number of the processing target pixel group to update pg, and transition is made to step S1116. For example, if the processing target pixel group is pg=0, then pg_update is given 15 as an initial value, and therefore the next processing target pixel group pg becomes 15. Meanwhile, in step S1115, the value of pg_update is subtracted from the parameter pg which indicates the number of the processing target pixel group to update pg, and transition is made to step S1116. For example, if the processing target pixel group is pg=15, and pg_update is 14, the next processing target pixel group pg becomes 1.

In step S1116, pg_update is updated by subtracting 1 from its current value. For example, if pg_update is 15, pg_update after the update is 14. Also, sign is updated by decreasing its current value from 1. With this calculation, sign alternates between 0 and 1. Furthermore, by adding 1 to the current value of pg_num, the processed number of pixel groups is updated. After this, the processing continues after returning to step S1106.

By the foregoing processing, pg which indicates the processing target pixel group starts at an initial value of 0, and in accordance with update processing of step S1114 and step S1115 it switches from 15 to 1 to 14 to 2 to 13 to 3 to 12 to 4 to 11 to 5 to 10 to 6 to 9 to 7 to 8 in that order, and the block code length calculation is executed gradually directed from the pixel groups on the left and right ends of the blocks towards the pixel group at the center. Transition is made to step S1117 if the block code length thus calculated exceeds the target code amount ("NO" in step S1109). The processing of step S1117 and step S1118 is similar to the processing of step S714 and step S715.

Here, a concrete example of the process in FIG. 11 will be explained with reference to FIG. 8E for the case of the input of FIG. 4A. First, based on the selected sel_size (326 in the example of FIG. 8E), the block code length (326−24+27=329) in a case where the value of QP of the pixel group of the pixel group number 0 is made smaller by 1 is calculated, and compared with the target code amount (360). If the calculated block code length is less than or equal to the target code amount, a block code length for a case where the QP of the subsequent pixel group number 1 is made smaller by 1 is calculated, and compared with the target code amount similarly. The block code length of the pixel group number 15 calculated here is (329−16+18=331), which is smaller than the target code amount. In this fashion, block code lengths are calculated by selecting pixel groups in order as follows.

Pixel group number 1: 331−24+27=334
Pixel group number 14: 334−18+18=334
Pixel group number 2: 334−24+27=337
Pixel group number 13: 337−16+20=341
Pixel group number 3: 341−18+22=345
Pixel group number 12: 345−12+12=345
Pixel group number 4: 345−19+23=349
Pixel group number 11: 349−15+18=352
Pixel group number 5: 352−15+18=355
Pixel group number 10: 355−17+17=355
Pixel group number 6: 355−13+15=357
Pixel group number 9: 357−18+22=361

In the foregoing calculated block code length, a block code length of the pixel group number 9 exceeds the target code amount. Accordingly, after this, the pixel group number 0 is returned to once again, the value of QP is caused to be further decreased by 1, and the block code length is calculated similarly. However, if MAX_DIFF=1, processing terminates at this point in time.

Pixel group number 0: 357−27+30=360
Pixel group number 15: 360−18+18=360
Pixel group number 1: 360−27+30=363

Here, the target code amount is exceeded for the pixel group number 1. Because the value of qp at this point in time is 0, the processing terminates. Specific values for the application QP that are decided in this way are illustrated in FIG. 8E. In FIG. 8E, the QPs corresponding to the code lengths surrounded in the bold lines represent the application QPs decided for each pixel group. For each value of the application QP of a pixel group unit, pg_qp[0] is 0, pg_qp[1−6] is 1, pg_qp[7−9] is 2, pg_qp[10−14] is 1, and pg_qp[15] is 0.

In this way, in the present embodiment, smaller QPs are assigned to the pixel groups positioned at the head and the tail ends of the encoding block, and large QPs are assigned to pixel groups positioned close to the center of the encoding block. With this, the QP values in block are distributed to be lower at both ends of the block (that is, the block boundary portions) and higher at the central portion of the block. With this, it is possible to make the difference in QP values of the boundary portion of adjacent blocks smaller, and the image quality of the block boundary portion uniform, and therefore it is possible to reduce the block boundary being seen as unnatural.

Third Embodiment

Next, explanation is given for another embodiment of the invention. A point of difference between the third embodiment and the above-described first embodiment is the processing method internal to the multiplexing unit 123, and because configuration and operation of other encoding units, the QP deciding unit, the delay unit, and the multiplexing unit are the same as in the first embodiment, explanation is omitted.

In the multiplexing unit 123, the code data, the code length and the PCM/DPCM selection flag from the encoding unit 111E, and the QP from the QP deciding unit 115 are inputted, and multiplexing is performed in a predetermined format for each encoding block. Here, the QPs from the QP deciding unit 115, as explained in relation to FIG. 8B in the first embodiment, have a regularity:

pg_qp [0]=0,
pg_qp[1-12]=1
pg_qp[13-15]=2

In the first embodiment, as is illustrated in FIG. 10A, 32 bits worth are prepared for a region 1004 that stores the QP. However, in the example of the third embodiment, it is possible, without storing all QPs, to restore a QP arrangement pattern in an encoding block if there is information of the head (pixel group number: 0) QP and the pixel group number indicating the positions that the QP switches. Accordingly, the head QP, the pixel group number where the QP changes the first time, and the pixel group number that the QP changes the second time are stored in the header as qp0, qp_pos1 and qp_pos2. Reduction of the header code length by such a format becomes possible.

Also, above, the head QP, that is the lowest QP, was made to be the QP value that should be stored, but the same effect can be achieved in the case where it is made to be the maximum QP that is assigned. This is because even in such a case, it is possible to reproduce a correct QP assignment if the switching positions can be identified.

Explanation is given of an example of a header format corresponding to the present embodiment using FIG. 10B. FIG. 10B is a view that illustrates an example of a data structure of an encoding format, and encoded data 1011 for the block on the whole (360 bits) is comprised from a header portion 1012 (26 bits) and a pixel data portion 1013 (334 bits). The header portion 1012 is comprised by a QP value portion 1014 (10 bits) that stores values of QPs, and a flag portion 1015 (16 bits) that stores PCM/DPCM selection flags. 2 bits (1016) for qp0, 4 bits for qp_pos1 (1017), and 4 bits for qp_pos$^2$ (1018) are stored in the QP value portion 1014. In the example of FIG. 8B, the values (0, 1, 13) are stored. Sixteen 1 bit flag values for the PCM/DPCM selection flags (1015_0-1015_f) for each pixel group are stored in the flag portion 1015. The number of pixels worth (3×16=48 pixel's worth) of variable-length code data is stored in the pixel data portion 1013. The encoded data 1011 which is multiplexed is outputted as stream data to the output terminal 102, and is outputted to image memory or a bus interface (not shown).

In the header format illustrated in FIG. 10B, because the header code length is 26 bits and the image data portion code length is 334 bits, the method of calculating the block code length and the target code amount value in the foregoing embodiment are different. Specifically, if, the header code length is considered in the calculation of the block code length bl_size[qp] in step S502 of FIG. 5, its size is made to be 26 bits. If the header code length is not considered in the block code length calculation, the target code amount of step S503 is made to be 334 bits.

In FIG. 10B, a case in which 2 pieces of information of QP switching positions are caused to be held in the header portion is explained; however, the number of pieces of information of switching positions that should be included in the header portion depends on the value of MAX_DIFF which is used in the determination in step S714 of FIG. 7. FIG. 10B illustrates a case in which MAX_DIFF=2, but if MAX_DIFF=1, it suffices to have 4 bits for qp_pos1 as the information of the position of switching, and therefore it is possible to reduce further the size of the header portion 1012 by 4 bits, and to increase further the size of the pixel data portion 1013 by 4 bits.

As explained above, in the present embodiment, when storing the QP in the header in the multiplexing unit 123, information of the initial value of QP, and the positions at which QP switches are stored rather than storing the values of QP in the header unchanged. Thereby it is possible to reduce the code length of the header portion and to cause the size of the pixel data included in the encoded data to increase. As a result it is possible to increase the proportion of usage of a QP whose quantization step is small, and further decrease a degradation of image quality due to encoding.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-177919 filed on Sep. 9, 2015, which is hereby incorporated by reference herein in its entirety.

What is claimed is:

1. An image processing apparatus comprising: one or more processors; and a memory storing a computer program comprising instructions, when executed by the one or more processors, cause the one or more processors to function as:

an acquisition unit configured to input image data, and to output image data of blocks comprising a plurality of groups each including a predetermined number of pixels, wherein the acquisition unit changes an order of the image data from an order of the inputted image data, so that arrangements of pixels between adjacent blocks are in reverse order of each other;

a deciding unit configured to decide, for each of the groups, a quantization parameter, that is used for quantization of image data of the group, and an encoding scheme such that a code length of the blocks, which are encoding target blocks, does not exceed a predetermined value; and an encoding unit configured to, in accordance with the quantization parameter and encoding scheme decided for each group by the deciding unit, encode the image data of the encoding target blocks output from the acquisition unit to generate encoded data, wherein the encoding unit encodes the image data using a first encoding scheme for outputting quantized image data and a second encoding scheme for outputting encoded data of a differential between quantized image data and predicted data, and wherein the deciding unit decides as the encoding scheme of the group whichever of the first encoding scheme and the second encoding scheme can achieve a smaller code length, and wherein the deciding unit, among a plurality of quantization parameters, decides as the quantization parameter of the group either a first quantization parameter, or a second quantization parameter corresponding to a smaller quantization step than the quantization step corresponding to the first quantization parameter, and wherein the deciding unit, so that the code length of the encoded data of the encoding target blocks, which are generated by quantizing all of the groups of the encoding target blocks using the first quantization parameter and encoding the respective groups using the decided encoding schemes, does not exceed the predetermined value and is a maximum value, decides one of the plurality of quantization parameters as the first quantization parameter, and decides the second quantization parameter as the quantization parameter for some of the groups of the encoding target blocks.

2. The apparatus according to claim 1, wherein the deciding unit decides the second quantization parameter as the quantization parameter of at least a head group among the plurality of groups of the encoding target blocks.

3. The apparatus according to claim 2, wherein the deciding unit decides the second quantization parameter as the quantization parameter of a plurality of consecutive groups including the head group among the plurality of groups of the encoding target blocks.

4. The apparatus according to claim 3, wherein the deciding unit decides the first quantization parameter as the quantization parameter of groups other than the plurality of consecutive groups including the head group among the plurality of groups of the encoding target blocks.

5. The apparatus according to claim 1, the deciding unit decides the second quantization parameter as the quantization parameter of at least a head group and a final group among the plurality of groups of the encoding target blocks.

6. The apparatus according to claim 1, wherein the deciding unit decides the some of the groups so that a total of a first total and a second total does not exceed the predetermined value and is a maximum value, wherein the first total is a total of code lengths of encoded data generated by quantizing using the second quantization parameter the some of the groups of the encoding target blocks, and encoding the some of the groups respectively using the decided encoding schemes, and the second total is a total of code lengths of encoded data generated by quantizing using the first quantization parameter the other groups and encoding the other groups using the decided encoding schemes.

7. The apparatus according to claim 1, wherein the computer program further comprising instructions, when executed by the one or more processors, cause the one or more processors to function as:

a multiplexing unit configured to multiplex encoded data and additional information of the encoding target blocks generated by the encoding unit, and outputting stream data including the encoded data and the additional information, wherein the additional information includes first information for identifying each quantization parameter of the plurality of groups of the encoding target blocks and second information for identifying the respective encoding schemes of the plurality of groups included in the encoding target blocks.

8. The apparatus according to claim 7, wherein the first information indicates one of the first quantization parameter and the second quantization parameter, and a switching position between the some of the groups and the other groups.

9. The apparatus according to claim 1, wherein the second quantization parameter is a quantization parameter corresponding to the smallest quantization step after the first quantization parameter among the plurality of quantization parameters.

10. The apparatus according to claim 1, wherein in the plurality of quantization parameters, a quantization result becomes 1 bit smaller whenever the quantization parameter becomes larger by one.

11. The apparatus according to claim 1, wherein the image data includes pixels of a plurality of colors, and the groups include pixels of different colors.

12. The apparatus according to claim 1, wherein the acquisition unit changes the order of the image data so that for every other block, the order of pixels is the opposite of an input order.

13. An image processing method comprising:

outputting image data of blocks comprising a plurality of groups each including a predetermined number of pixels, wherein an order of the image data is changed from an order of inputted image data so that arrangements of pixels between adjacent blocks are in reverse order of each other;

deciding, for each of the groups, a quantization parameter, that is used for quantization of image data of the group, and an encoding scheme such that a code length of the blocks, which are encoding target blocks, does not exceed a predetermined value; and in accordance with the quantization parameter and encoding scheme decided for each group, encoding the image data of the outputted encoding target blocks to generate encoded data, wherein in the encoding, the image data is encoded using a first encoding scheme for outputting quantized image data and a second encoding scheme for outputting encoded data of a differential between quantized image data and predicted data, and wherein in the deciding, whichever of the first encoding scheme and the second encoding scheme can achieve a smaller code length is decided as the encoding scheme of the group, and among a plurality of quantization parameters, either a first quantization parameter or a second quantization parameter corresponding to a smaller quantization step than the quantization step corresponding to the first quantization parameter is decided as the quantization parameter of the group, and so that the code length of the encoded data of the encoding target blocks, which are generated by quantizing all of the groups of the encoding target blocks using the first quantization parameter and encoding the respective groups using the decided encoding schemes, does not exceed the predetermined value and is a maximum value, one of the plurality of quantization parameters is decided as the first quantization parameter, and the second quantization parameter is decided as the quantization parameter for some of the groups of the encoding target blocks.

* * * * *